(12) United States Patent
Kantor et al.

(10) Patent No.: US 7,523,164 B2
(45) Date of Patent: Apr. 21, 2009

(54) SYSTEMS AND METHODS FOR TRANSACTION MESSAGING BROKERING

(75) Inventors: Jiri Kantor, London (GB); Andrew Patterson, Chatham (GB); Paul Bevis, Harrow (GB); David Turvey, Ely (GB); Craig McMillan, London (GB); Andrew Sadler, Colchester (GB)

(73) Assignee: Sun Microsystems, Inc., Santa Clara, CA (US)

( * ) Notice: Subject to any disclaimer, the term of this patent is extended or adjusted under 35 U.S.C. 154(b) by 1433 days.

(21) Appl. No.: 10/219,459

(22) Filed: Aug. 15, 2002

(65) Prior Publication Data

US 2003/0126077 A1 Jul. 3, 2003

(30) Foreign Application Priority Data

Aug. 16, 2001 (GB) ................................. 0120015.3

(51) Int. Cl.
*G06F 15/16* (2006.01)
*G06F 15/173* (2006.01)
*G08C 25/02* (2006.01)
*G06F 9/46* (2006.01)
*G06F 11/00* (2006.01)
*H04L 1/18* (2006.01)

(52) U.S. Cl. .............. 709/206; 709/207; 709/223; 709/224; 709/237; 709/248; 718/101; 714/748; 714/749

(58) Field of Classification Search ............... 709/203, 709/206, 207, 219, 223–229, 237, 248; 705/35, 705/42; 718/101; 707/201; 713/375; 714/748, 714/749
See application file for complete search history.

(56) References Cited

U.S. PATENT DOCUMENTS

| 5,305,200 | A |   | 4/1994 | Hartheimer et al. |
|---|---|---|---|---|
| 5,499,384 | A | * | 3/1996 | Lentz et al. ..................... 710/1 |
| 5,544,329 | A | * | 8/1996 | Engel et al. ..................... 710/6 |
| 5,634,127 | A | * | 5/1997 | Cloud et al. ................. 719/313 |
| 5,671,279 | A | * | 9/1997 | Elgamal ....................... 705/79 |

(Continued)

FOREIGN PATENT DOCUMENTS

EP             0 275 135             7/1988

(Continued)

OTHER PUBLICATIONS

Coulson, Geoff and Baichoo, Shakuntala. "Implementing the CORBA GIOP in a high-performance object request broker environment," Distributed Computing, vol. 14, No. 2, Apr. 2001, pp. 113-126.*

(Continued)

*Primary Examiner*—Larry D Donaghue
*Assistant Examiner*—Melvin H Pollack
(74) *Attorney, Agent, or Firm*—Meyertons Hood Kivlin Kowert & Goetzel, P.C.

(57) ABSTRACT

A message brokering mechanism for a transaction processing system may include first and second stages operable to exchange message requests and responses. The first stage may be operable to receive a message request from a message source and to check whether there is an existing first stage response to the message request. In some embodiments, if there is an existing first stage response, the first stage may dispatch the existing first stage response to the message source.

37 Claims, 13 Drawing Sheets

U.S. PATENT DOCUMENTS

| | | | |
|---|---|---|---|
| 5,696,966 A * | 12/1997 | Velarde | 707/10 |
| 5,706,434 A * | 1/1998 | Kremen et al. | 709/218 |
| 5,720,455 A * | 2/1998 | Kull et al. | 246/187 C |
| 5,764,977 A * | 6/1998 | Oulid-Aissa et al. | 707/10 |
| 5,835,757 A * | 11/1998 | Oulid-Aissa et al. | 707/10 |
| 5,928,363 A * | 7/1999 | Ruvolo | 726/22 |
| 5,982,293 A | 11/1999 | Everett et al. | |
| 6,199,100 B1 * | 3/2001 | Filepp et al. | 709/203 |
| 6,237,035 B1 | 5/2001 | Himmel et al. | |
| 6,253,369 B1 * | 6/2001 | Cloud et al. | 717/136 |
| 6,256,659 B1 * | 7/2001 | McLain et al. | 718/100 |
| 6,483,912 B1 * | 11/2002 | Kalmanek et al. | 379/219 |
| 6,523,102 B1 * | 2/2003 | Dye et al. | 711/170 |
| 6,529,932 B1 * | 3/2003 | Dadiomov et al. | 718/101 |
| 6,636,855 B2 * | 10/2003 | Holloway et al. | 707/10 |
| 6,647,510 B1 | 11/2003 | Ganesh et al. | |
| 6,732,124 B1 | 5/2004 | Koseki et al. | |
| 6,772,363 B2 | 8/2004 | Pedone et al. | |
| 6,817,018 B1 * | 11/2004 | Clarke et al. | 719/313 |
| 6,836,803 B1 | 12/2004 | Swartz et al. | |
| 6,856,970 B1 * | 2/2005 | Campbell et al. | 705/35 |
| 6,898,574 B1 | 5/2005 | Regan | |
| 6,922,685 B2 * | 7/2005 | Greene et al. | 707/1 |
| 6,925,482 B2 | 8/2005 | Gopal et al. | |
| 6,934,247 B2 | 8/2005 | Bhattal et al. | |
| 6,950,867 B1 * | 9/2005 | Strohwig et al. | 709/224 |
| 6,961,750 B1 * | 11/2005 | Burd et al. | 709/203 |
| 6,976,260 B1 | 12/2005 | Ault et al. | |
| 6,978,279 B1 | 12/2005 | Lomet et al. | |
| 6,983,409 B1 * | 1/2006 | Vollmer et al. | 714/748 |
| 6,996,711 B2 * | 2/2006 | Patterson et al. | 713/156 |
| 7,003,571 B1 | 2/2006 | Zombek et al. | |
| 7,010,590 B1 | 3/2006 | Munshi | |
| 7,032,005 B2 | 4/2006 | Mathon et al. | |
| 7,062,749 B2 * | 6/2006 | Cyr et al. | 717/103 |
| 7,069,554 B1 * | 6/2006 | Stammers et al. | 717/178 |
| 7,089,564 B2 | 8/2006 | Chen et al. | |
| 7,092,940 B1 | 8/2006 | Ethen et al. | |
| 7,103,016 B1 * | 9/2006 | Duffy et al. | 370/312 |
| 7,110,969 B1 * | 9/2006 | Bennett et al. | 705/35 |
| 7,110,981 B1 * | 9/2006 | Sidikman et al. | 705/43 |
| 7,117,172 B1 * | 10/2006 | Black | 705/35 |
| 7,140,017 B2 | 11/2006 | Chen et al. | |
| 7,155,483 B1 * | 12/2006 | Friend et al. | 709/206 |
| 7,162,512 B1 | 1/2007 | Amit et al. | |
| 7,177,917 B2 | 2/2007 | Giotta | |
| 7,206,805 B1 | 4/2007 | McLaughlin, Jr. | |
| 7,219,260 B1 | 5/2007 | de Forest et al. | |
| 7,249,344 B1 | 7/2007 | Zeanah et al. | |
| 7,266,526 B1 * | 9/2007 | Drummond et al. | 705/43 |
| 7,277,919 B1 | 10/2007 | Donoho et al. | |
| 7,289,964 B1 * | 10/2007 | Bowman-Amuah | 705/1 |
| 7,290,056 B1 * | 10/2007 | McLaughlin, Jr. | 709/230 |
| 7,293,090 B1 | 11/2007 | Saleh et al. | |
| 6,769,079 B1 | 7/2008 | Currey et al. | |
| 2001/0049743 A1 * | 12/2001 | Phippen et al. | 709/237 |
| 2003/0014464 A1 * | 1/2003 | Deverill et al. | 709/101 |
| 2003/0126229 A1 | 7/2003 | Kantor | |
| 2003/0158923 A1 * | 8/2003 | Burkhart | 709/223 |

FOREIGN PATENT DOCUMENTS

| | | |
|---|---|---|
| EP | 0471090 | 3/1991 |
| EP | 0 557 025 | 8/1993 |
| GB | 2314663 | 5/1996 |
| GB | 2378781 A * | 2/2003 |
| GB | 2378782 | 2/2003 |
| WO | 95/10805 | 4/1995 |
| WO | 97/46939 | 12/1997 |
| WO | 0133407 | 5/2001 |

OTHER PUBLICATIONS

Banavar, Guruduth, et al. "A Case for Message Oriented Middleware," Lecture Notes in Computer Science, Distributed Computing, vol. 1693, Jan. 1999, p. 846.*

Gasikanti, A. et al. "Information Disovery Across Organizational Boundaries through Local Caching," IEEE International Conference on Services Computing, Jul. 13, 2007, pp. 522-529.*

Nahrstedt, Klara and Smith, Jonathan M. "The QoS Broker," IEEE MultiMedia, 1995, pp. 1-29.*

Braden, R. "T/TCP—TCP Extensions for Transactions Functional Specification," RFC 1644, Jul. 1994, pp. 1-38.*

Elliott, J. and Ordille, J. "Simple Nomenclator Query Protocol (SNQP)," RFC 2259, Jan. 1998, pp. 1-30.*

Allen, J. and Mealling, M. "The Architecture of the Common Indexing Protocol (CIP)," RFC 2651, Aug. 1999, pp. 1-19.*

Braden, R. and Zhang, L. "Resource ReSerVation Protocol (RSVP)—Version 1 Message Processing Rules," RFC 2209, Sep. 1997, pp. 1-25.*

Case, J. et al. "Message Processing and Dispatching for the Simple Network Management Protocol (SNMP)," RFC 2572, Apr. 1999, pp. 1-44.*

DeWinter J. "SMTP Service Extension for Remote Message Queue Starting," RFC 1985, Aug. 1996, pp. 1-7.*

Evans, K. et al. "Transaction Internet Protocol—Requirements and Supplemental Information," RFC 2372, Jul. 1998, pp. 1-24.

Lyon, J. et al. "Transaction Internet Protocol, Version 3.0," RFC 2371, Jul. 1998, pp. 1-31.

Bossert, G. et al. "Considerations for Web Transaction Security," RFC 2084, Jan. 1997, pp. 1-6.

Crocker, D. et al. "SMTP Service Extension for Checkpoint/Restart," RFC 1845, Sep. 1995, pp. 1-7.

"Method for Avoiding and Repairing Damage to Distributed Transactions in a Coordinated Resource Recovery System," IBM Technical Disclosure Bulletin, EBM Corporation, vol. 33, No. 10A, pp. 362-366, Mar. 1, 1991.

European Search Report, Reference P011535EP JMP, Application No. 02255688, Aug. 29, 2005.

Office Action in U.S. Appl. No. 10/219,461, mailed Sep. 20, 2007.

International Search Report, Application No. GB 0120016.1, Mailed May 20, 2002.

European Search Report, Reference P011693EP JMP, Application No. 02255700.3-2221, Aug. 19, 2005.

International search report application No. GB 0120015.3 mailed May 21, 2002.

"Duplicate Transaction System (DTS) Documentation", Intellipay, Inc., US, Mar. 2001, www.intellipay.com/docs/DTS.html.

Office Action dated Jul. 9, 2008 in pending U.S. Appl. No. 10/219,461, filed Aug. 15, 2002 entitled: Message Brokering, Kantor, et al.

* cited by examiner

SYSTEMS AND METHODS FOR TRANSACTION MESSAGING BROKERING

BACKGROUND OF THE INVENTION

The present invention relates to message brokering. Illustrative embodiments relate to, but not exclusively to, message brokering in electronic transaction processing systems.

Transaction processing systems are used to manage transactions in which an instructing party desires that an action be performed, often remotely, by at least one further party. In order for a transaction to take place between the parties, the instructing party provides a message to the further party requesting that the desired action be performed. In addition to the further party receiving the request to perform a desired action, the transaction process usually also entails a response message being sent from the further party to the instructing party either to confirm that the action has been, or will be, completed, or to state that the transaction request has failed and/or why the desired action has failed.

An example of an action that might be performed as part of a transaction includes the case where a first party instructs a second party to request authorisation of a payment from a third party. In recent years both the number and the importance of such transactions involving third parties, particularly in respect of those involving financial or commercial transactions, have increased enormously due to the advent of inexpensive and readily-available networked electronic systems. In particular, growth in the use of such transactions is in large part attributable to the growth in Internet use for electronic commerce, where a user will typically buy a product on-line from a retailer by providing personal details to the retailer who will subsequently use the services of another party, such as a bank or credit card company, to authorise a payment for the product before it can be shipped to the user.

Where financial transactions are processed using the Internet, certain disadvantages may manifest themselves. In certain systems in which transactions are received from the Internet and then processed by a banking system, the danger exists of the banking system receiving repeat identical requests to process the same transaction. This may happen if a response to a message request indicating that the message request has been dealt with is delayed or lost in transmission from the banking system to the instructing party, subsequently causing the instructing party to issue repeat requests. An added danger also exists that the banking system may perform a transaction, such as, for example, crediting a retailer account and debiting a user account, more than once under the instruction of one or more repeat requests. However, even if the banking system is configured to ignore repeat requests, handling them consumes valuable processing time and slows down the processing of valid transactions. As a result of this such systems are open to denial of service attacks during which they are bombarded with repeat invalid transaction requests in order to prevent the processing of legitimate requests. Furthermore, the delay caused by having to handle repeat requests is often compounded by the fact that the banking system will often comprise older, and slower, legacy computer systems for performing transactions.

SUMMARY OF THE INVENTION

According to a first aspect of the invention, there is provided a message brokering mechanism for an automated transaction processing system, comprising first and second stages operable to exchange message requests and responses, wherein the first stage is operable to receive a message request from a message source and to check whether there is an existing first stage response to the message request and, conditional on there being an existing first stage response, to dispatch the existing first stage response to the message source. The first stage may be operable conditional on there being no existing first stage response, to determine whether the message request has been dispatched previously to the second stage and, where the message request has not been dispatched previously to the second stage, to dispatch the message request to the second stage.

The message brokering mechanism is operable to control, or broker, the dispatch of message requests and responses between the first and second stages. The first and second stages may comprise logic modules implemented using software, firmware or hardware elements, or any combination thereof, and the stages may form part of one or more interfaces between the message brokering mechanism and other systems, processes etc. Where a message request is identified as having a known existing first stage response, such as might be the case if the message request is a repeated message, the existing response is dispatched back to the message source. By using this arrangement the first stage acts to screen the second stage from repeat requests for which there is already an existing response. A request for which a critical action (such as the processing of a transaction, for example) is performed only once in response to that request being received, no matter how many times the request is repeated, is said to be idempotent. Systems or processes implementing such request handling may be referred to as idempotent systems or processes, or as exhibiting idempotency. One or more of the stages may posses the property of idempotency, e.g. two-stage idempotency can be implemented.

Configuring the first stage as described above allows an incoming repeat message request sent from the message source to be quickly dealt with by the message brokering mechanism without needing to dispatch the repeat request to any "back-end" request processing mechanism, such as a banking system, that may be linked to the message brokering mechanism. In addition, not only is the amount of processing that must be performed by the back-end mechanism reduced, but also the message source sees an improved speed of response to repeat message requests, thereby reducing the likelihood that any further repeat message requests will be sent by it.

Where there is no existing first stage response and the message request has been dispatched previously to the second stage, the first stage may be operable to dispatch a message indicating that a response to the request is not ready for transmission to the message source. This message informs the message source that the request is "in progress", thereby allowing the message source to perform other tasks without having to waste time sending further repeat message requests to the message brokering mechanism.

The "in progress" message, or a token or indicator identifying it, may then be recorded as an existing first stage response that will be dispatched again to the message source in response to any further repeat message requests received by the first stage. This reduces the amount of processing that is needed by the first stage in responding to further repeat message requests. Subsequently, once received by the first stage, a response to the original message request may be dispatched to the message source and a copy used to overwrite the previous "in progress" message (or token or indicator). Responses may comprise any form of information, such as a simple acknowledgement message or, for example, more complex information such as authorisation codes and/or encrypted data/software/information etc.

The second stage is operable to receive a message request from the first stage. The second stage may be further operable to check whether there is an existing second stage response to the message request and, conditional on there being an existing second stage response, to dispatch the existing second stage response to the first stage. The second stage may therefore be operable to screen any further mechanisms (such as software, hardware, firmware, etc. or any combination thereof) to which the second stage is connected from repeat requests for which there is already an existing response.

The second stage may be operable to check whether the message request has been dispatched previously to a message processor and, where the message request has not been dispatched previously to a message processor, to dispatch the message request to a message processor. The message processor may then process the message request and generate an associated response for dispatching to the first stage. The second stage may form a component of an interface to a transaction processing system, such as, for example, a banking system.

A message queue mechanism may also be included in the second stage. The message queue mechanism may act as an interface between the second stage and the message processor, and may be used where the message processor is reliable. However, if the message processor is not completely reliable the message processor may lose a message request. Furthermore, if the message processor is not a transactional message processor, should the message processor lose a message request then there is no way to recover the transaction associated with that message request, other than by way of intervention by an administrator.

A further aspect of the invention addresses the issue of automatically attending to recovery of transactions should they be lost by, or on their way to or from, the message processor. The second stage may be operable to check, e.g. following the elapse of a predetermined time period (e.g. a "time out"), whether an actioned response has been dispatched from the message processor in response to the message request. The actioned response may indicate that the message processor has completed the action (or actions) necessary to deal with the message request. This enables the second stage to determine if a message request has been lost.

Although the second stage may be able to determine autonomously whether the message processor has lost a message request, it may either in addition, or alternatively, interrogate the message processor for information relating to the message request. In one example, the message processor and the second stage are able to communicate using query messages implemented according to a query protocol, such as, for example, a structured query language (SQL) protocol. The query messages can be used to indicate various states of the message processor to the second stage. This enables the second stage to tailor its actions according to the status of the message processor. For example, the second stage may re-dispatch the message request to the message processor so as to reinstate a transaction lost by the message processor. An additional benefit of using a query-based message brokering mechanism that may interrogate the message processor is that it allows the message brokering mechanism to be used idempotently with both transactional and non-transactional message processors.

Other examples of the information that query messages may convey include: that the message processor is currently processing the message request; that the message request has already been processed; the result of processing the message request; that the second stage should wait (e.g. for another "time out" period) and possibly resend the query later; and that the second stage should await the result of processing the message request. Query message responses can be used to tailor the operation of the second stage to suit a particular type of message processor, such as, for example, banking legacy systems of differing types.

The second stage may be further operable to dispatch a message indicating that a response to the request is not ready for transmission to the first stage, conditional on there being no existing second stage response and the message request having been dispatched previously to the message processor. This provides an early indication to the first stage that the message request is being processed, and this in turn may lead to the freeing of resources at the message source and/or the message brokering mechanism by helping to prevent the generation of repeat message requests.

In order to maintain records of previously dispatched message requests, the message brokering mechanism may record message identities. The responses, or indicators or pointers to them, may also be recorded along with associated identifiers so as to maintain dynamic records of existing first and/or second stage responses. This allows the message brokering mechanism to maintain records of the current processing state of transactions and any responses generated in response to them.

According to another aspect of the invention, messages may be dispatched between the first and second stages by a transaction control mechanism. The transaction control mechanism may comprise one or more of software, hardware, firmware and/or signal generating components (for example, radio frequency (RF), optical etc.). In one example, the transaction control mechanism comprises a transaction server operable to dispatch message requests and responses over a network. The network may be an existing payment services network, such as, for example, an automated teller machine (ATM) or a private banking network.

The transaction server may comprise a computer program element operating on a data processing apparatus that accepts requests destined for the second stage from the first stage and a network and associated services, through which the requests may be dispatched to the second stage. Where an intervening transaction control mechanism is used in combination with both first and second stage screening, not only is the second stage protected from repeat requests, but the transaction control mechanism can use repeat requests to test the reliability and/or response speed of the network without those repeat requests being actioned by comparing the existing responses and/or previously dispatched message requests of the two stages.

According to another aspect of the invention, there is provided a transaction processing system comprising a message brokering mechanism in accordance with any of the previously described aspects of the present invention. The message brokering mechanism may act as middleware located between a user generating message requests and a message processor, such as a banking system. In one such example, the message brokering mechanism is formed by using co-operating distributed components of both hardware and software.

According to another aspect of the present invention, there is provided a method of brokering messages, comprising: receiving a message request from a message source at a first stage; checking whether there is an existing first stage response to the message request; dispatching the existing first stage response to the message source, conditional on there being an existing first stage response; determining whether the message request has been dispatched previously to the second stage, conditional on there being no existing first stage response; and dispatching the message request to the second stage conditional on the message request not having been dispatched previously to the second stage. The method may comprise steps corresponding to any one, or any combination, of the operations that are capable of being performed by the message brokering mechanism or any element of it.

According to another aspect of the invention, there is provided a first stage logic module forming an element of the message brokering mechanism. According to yet another aspect of the invention, there is provided a second stage logic module forming an element of the message brokering mechanism. Each of the first and/or second stage logic modules may be implemented as a program element translatable to configure one or more data processing apparatus to provide the necessary functionality. The first and/or second stage logic modules may be part of an interface. The first and/or second stage logic modules may be modular computer program elements that can be added to an existing transaction controller software application, such as a trust based transaction controller, and/or various network routing services.

According to another aspect of the invention, there is provided a transaction processing system, comprising: at least one request generating apparatus operably coupled to a first network; a first stage operably coupled to the first network to receive message requests from and to dispatch message responses corresponding to respective processed message requests to the at least one request generating apparatus through the first network; a transaction controller server operably coupled to the first stage to receive message requests therefrom and to dispatch message responses thereto; a second stage operably coupled to the transaction controller server to receive message requests therefrom and to dispatch message responses thereto; and a transaction processing apparatus coupled to the second stage to process requests received therefrom and dispatch message responses corresponding to respective processed message requests thereto; wherein the transaction processing system is operable to inhibit, and in particular prevent, the transaction processing apparatus from receiving duplicate message requests from said at least one request generating apparatus. The transaction controller server may be operatively coupled to the second stage through a second network, such as, for example, a private banking network.

BRIEF DESCRIPTION OF THE DRAWINGS

Embodiments of the present invention will now be described, by way of example only, with reference to the accompanying drawings where like numerals refer to like parts and in which.

DESCRIPTION OF PARTICULAR EMBODIMENTS

Figure 1:
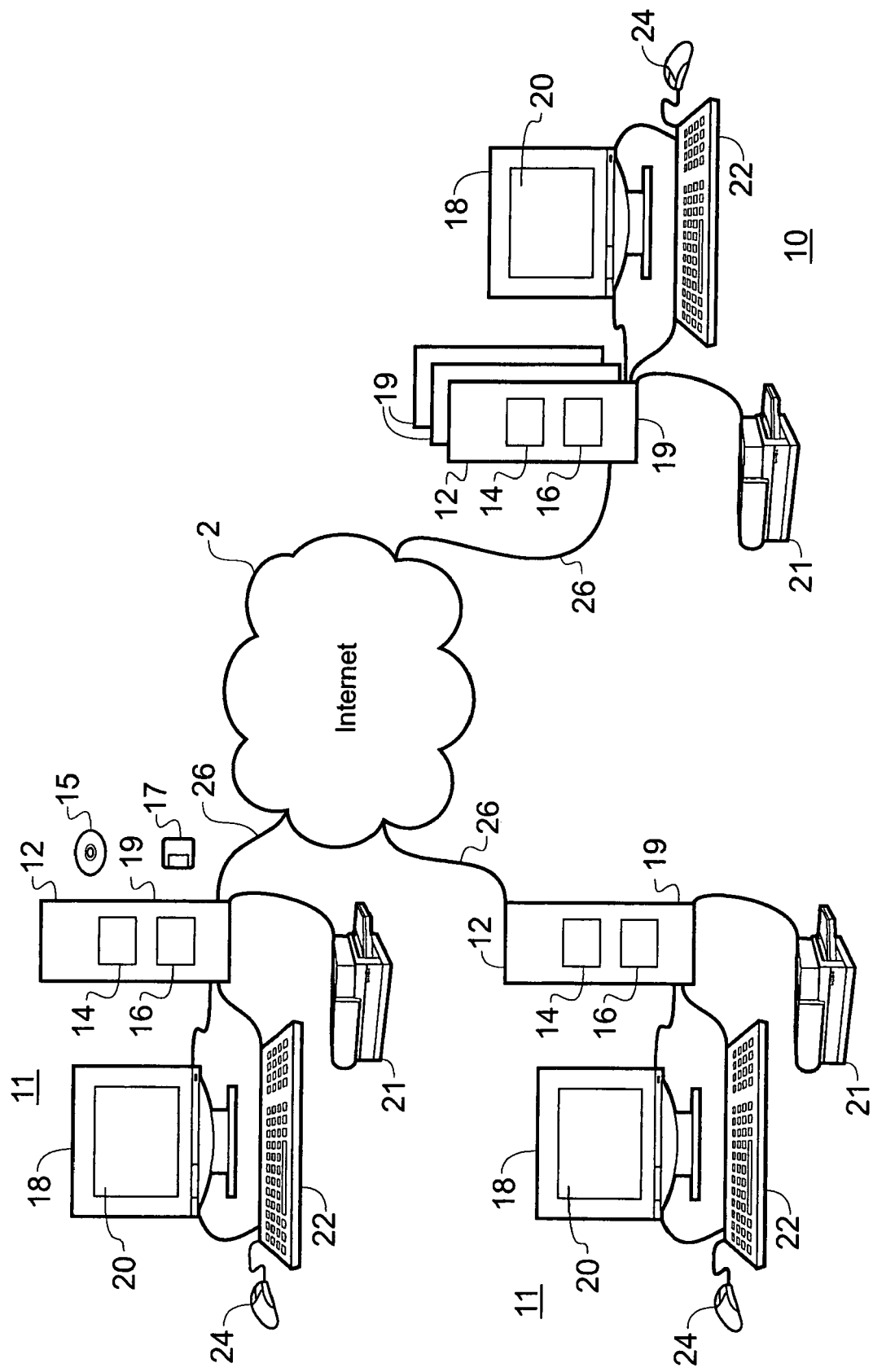
FIG. 1 shows a schematic representation of a network of computer systems usable to implement embodiments according to the present invention.

Referring now to FIG. 1, there is illustrated a schematic representation of a network of computer systems, such as the Internet, comprising a server computer system 10 and client computer systems 11. Both the server computer system 10 and the client computer systems 11 comprise similar components, for example a system unit 12, a display device 18 with a display screen 20, and user input devices, including a keyboard 22 and a mouse 24. A printer 21 is also connected to the system. Each system unit 12 comprises media drives, including an optical disk drive 14, a floppy disk drive 16 and an internal hard disk drive not explicitly shown in FIG. 1. A CD-ROM 15 and a floppy disk 17 are also illustrated. Additionally, server computer system 10 comprises high capacity storage media, such as further magnetic hard disks 19, for example.

A computer program for implementing various functions or conveying various information may be supplied on media such as one or more CD-ROMs and/or floppy disks and then stored on a hard disk, for example. The computer system shown in FIG. 1 is also connected through connections 26 to a network 2, which in the illustrated embodiment is the Internet but may be a local or wide area dedicated or private network, for example. The network may provide secure communications through the connections 26. A program implementable by a computer system may also be supplied on a telecommunications medium, for example over a telecommunications network and/or the Internet, and embodied as an electronic signal. For a client computer system 11 operating as a mobile terminal over a radio telephone network, the telecommunications medium may be a radio frequency carrier wave carrying suitably encoded signals representing the computer program and data or information. Optionally, the carrier wave may be an optical carrier wave for an optical fibre link or any other suitable carrier medium for a land line link telecommunication system.

Figure 2:
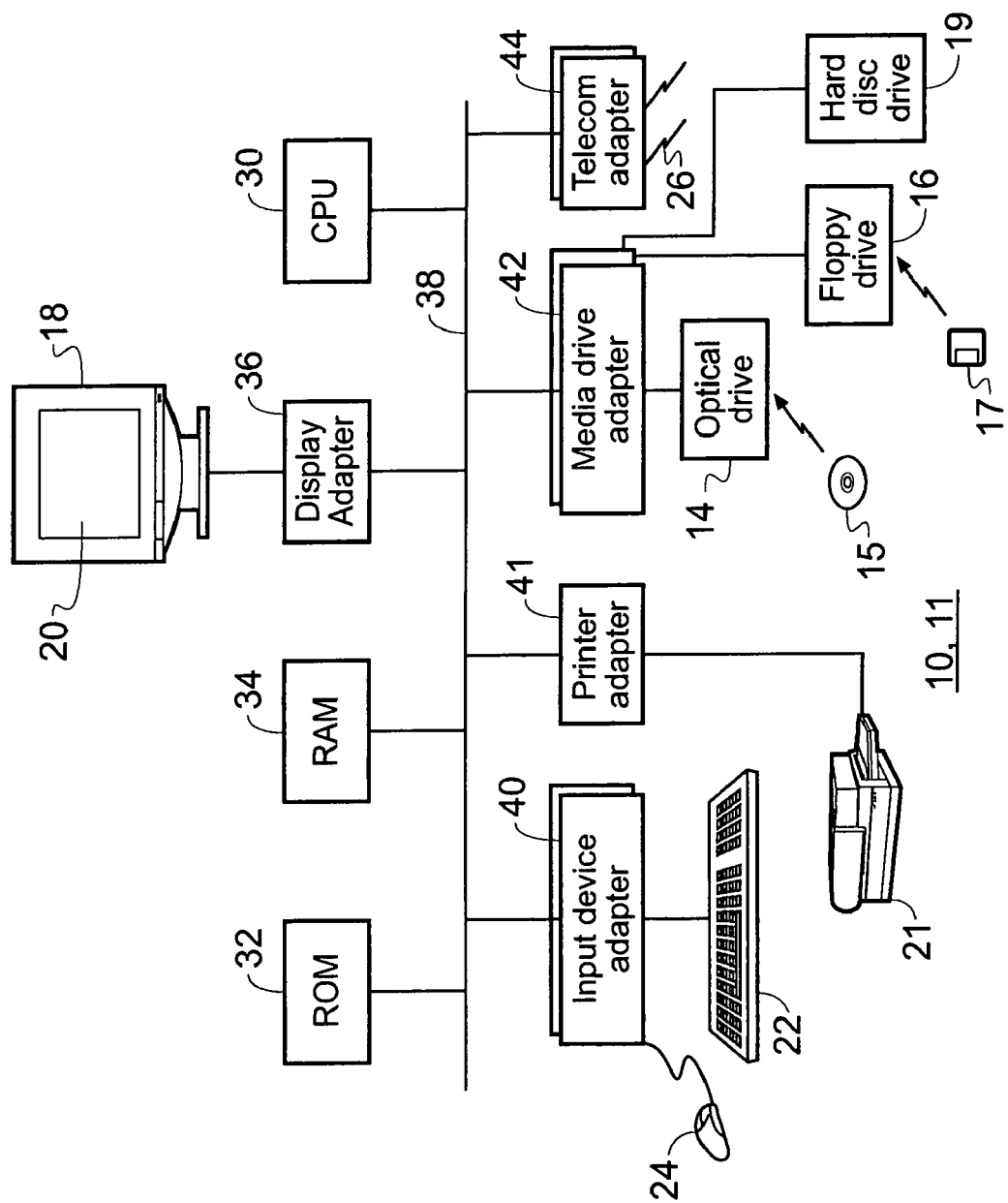
FIG. 2 shows a schematic representation of a computer system usable to implement embodiments according to the present invention.

Referring now to FIG. 2, there is shown a schematic and simplified representation of an illustrative implementation of a data processing apparatus in the form of a computer system such as that referred to with reference to FIG. 1. As shown in FIG. 2, the computer system comprises various data processing resources such as a processor (CPU) 30 coupled to a bus structure 38. Also connected to the bus structure 38 are further data processing resources such as read only memory 32 and random access memory 34. A display adaptor 36 connects a display device 18 to the bus structure 38. One or more user-input device adapters 40 connect the user-input devices, including the keyboard 22 and mouse 24 to the bus structure 38. An adapter 41 for the connection of the printer 21 may also be provided. One or more media drive adapters 42 can be provided for connecting the media drives, for example the optical disk drive 14, the floppy disk drive 16 and hard disk drive 19, to the bus structure 38. One or more telecommunications adapters 44 can be provided thereby providing processing resource interface means for connecting the computer system to one or more networks or to other computer systems. The communications adapters 44 could include a local area network adapter, a modem and/or ISDN terminal adapter, or serial or parallel port adapter etc, as required.

It will be appreciated that FIG. 2 is a schematic representation of one possible implementation of a computer system, suitable for one or more of a server computer system 10 and a client computer system 11. It will be appreciated, from the following description of embodiments of the present invention, that the computer system in which the invention could be implemented, may take many forms. For example, rather than the server computer system 10 comprising a display device 18 and printer 21, it may be merely necessary for the server computer system 10 to comprise a processing unit, and be accessible by client computer systems 11. The client computer may also be a non-PC type of computer which is Internet- or network-compatible, for example a Web TV, or set-top box for a domestic TV capable of providing access to a computer network such as the Internet.

Optionally, the client computer may be in the form of a wireless personal digital assistant (PDA), wireless application protocol (WAP) enabled telephone or a multimedia terminal.

Each computer system 10, 11 has a unique address within the Internet and within the terminology of the World Wide Web (WWW) these addresses are known as Uniform Resource Locators (URLs). Additionally, each entity within the WWW may also have a unique address or URL. An entity may comprise many different types of information, for example text, graphics, audio, video etc and may therefore be referred to as a hypermedia document or entity.

WWW software is based on client-server architecture. A web client, for example a browser, is a computer program which can send requests to a web server. These requests may be requests for information or requests to initiate certain tasks, such as transaction processes, for example. Often, for reasons of security, the requests and any responses to the requests are dispatched between a client computer system 10 and a server computer system 11 over a secure link, such as one created using a secure sockets layer (SSL) protocol, for example. A web server is a program which sends responses to requests from a client. The web server resides on a server computer system 10. The response received by the client is stored by a client computer system 11, typically on hard disc drive 19. The client program typically resides on hard disc drive 19 of the client computer system 11 and is operable to configure client computer system 11 to interface with the Internet and WWW.

Figure 3:
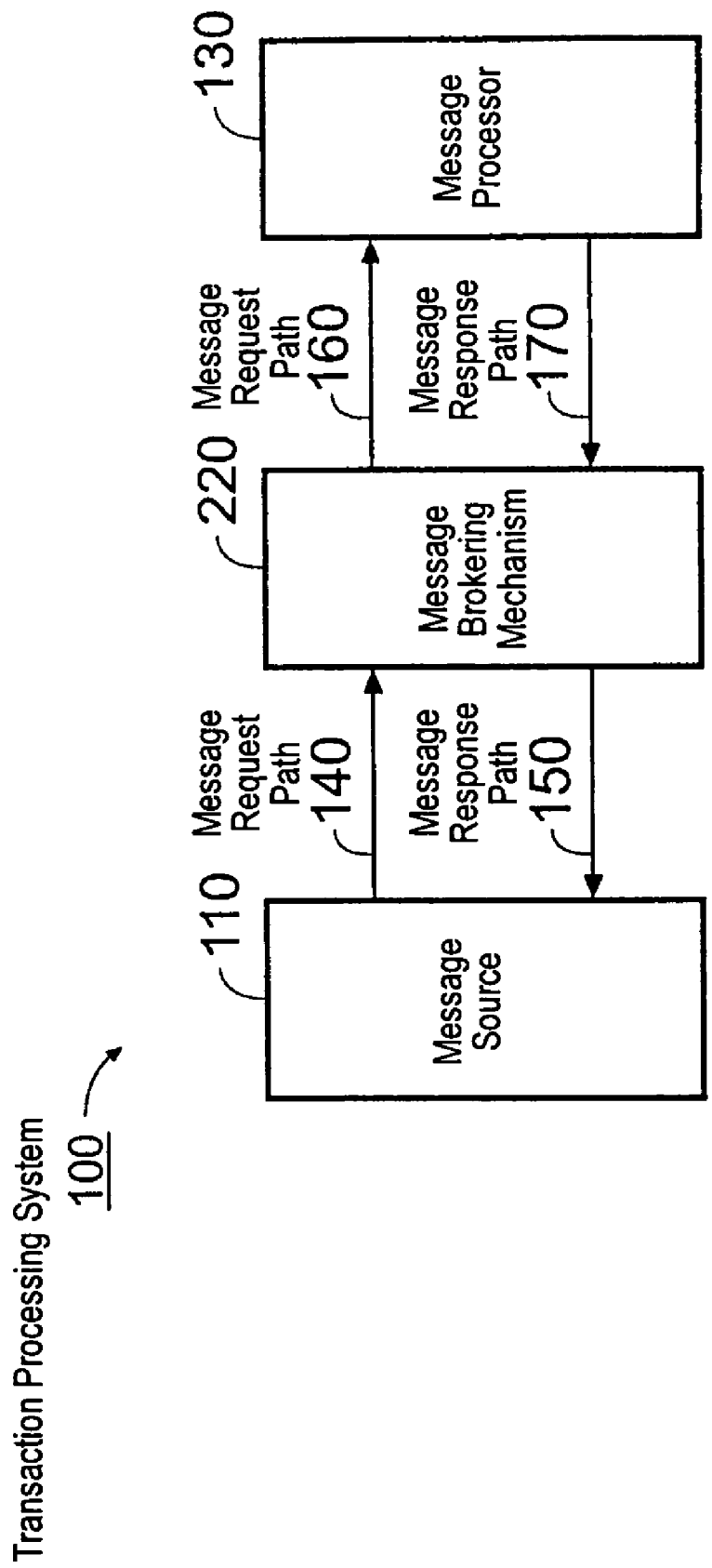
FIG. 3 shows a schematic representation of a transaction processing system comprising a message brokering mechanism.

FIG. 3 shows a schematic representation of a transaction processing system 100 comprising a message source 110, a message brokering mechanism 220 (see the various descriptions below) and a message processor 130. The message source 110 communicates message requests to the message brokering mechanism 220 along a message request path 140. The message brokering mechanism 220 is operable to dispatch responses to the message requests back to the message source 110 along a message response path 150. The message brokering mechanism 220 is also operable to dispatch the message requests received from the message source 110 to the message processor 130 along the message request path 160, and to receive responses from the message processor 130 along the message response path 170.

The message brokering mechanism 220 checks whether message requests it receives from the message source 110 already have an associated response. Where a message request is received for which there is already an associated response (hereinafter referred to as a duplicate message response), the associated response is dispatched to the message source 110 along the message response path 150. The message processor 130 is thus shielded from duplicate, or repeat, requests allowing more productive use of message processor 130 processing time. Message requests which have not already been dispatched to the message processor 130 are dispatched along the message request path 160. When the message processor 130 has received and/or processed the message requests, it sends an acknowledgement, possibly with further data, back to the message brokering mechanism 220 along the message response path 170. Responses received from the processor 130 by the message brokering mechanism 220 are then sent back to the message source 110 along the path 150.

In one example embodiment of the transaction processing system 100, the message source 110 is a client computer system 11 (See FIGS. 1 and 2). The client computer system 11 uses a web-browser program to send message requests to a server computer 10 using a secure link 140 through the network 2. The server computer 10 implements the message brokering mechanism 220 in software. The server computer is further connected to a message processor 130 through a private banking network in which message response paths 170 and message request paths 160 are created. The server computer 10 screens the message processor 130 from repeat message requests and logs all message requests and responses it receives. In addition, the server computer 10 uses a web server program to dispatch responses to message requests received from the message processor 130 back to the message source 110 over a secure link 150 through the network 2.

In another example embodiment of the transaction processing system 100, a first stage 221 (see FIG. 5, for example) of the message brokering mechanism 220 resides on a portable data processing device (such as, for example, a laptop computer, a PDA, a WAP-enabled mobile telephone, or personal organiser) that acts as a message source 110. The first stage 221 communicates with a second stage 222 of the message brokering mechanism 220 through a radio link, such as a cellular telephone link. The second stage 222 of the message brokering mechanism 220 forms part of the radio link's message control service. Use of the message brokering mechanism 220 in this embodiment helps prevent a user of the portable data processing device running up telephone usage costs when sending remote transaction requests by reducing the need for repeat message requests and thus the throughput of message requests between the first and second stages 221, 222.

Figure 4:
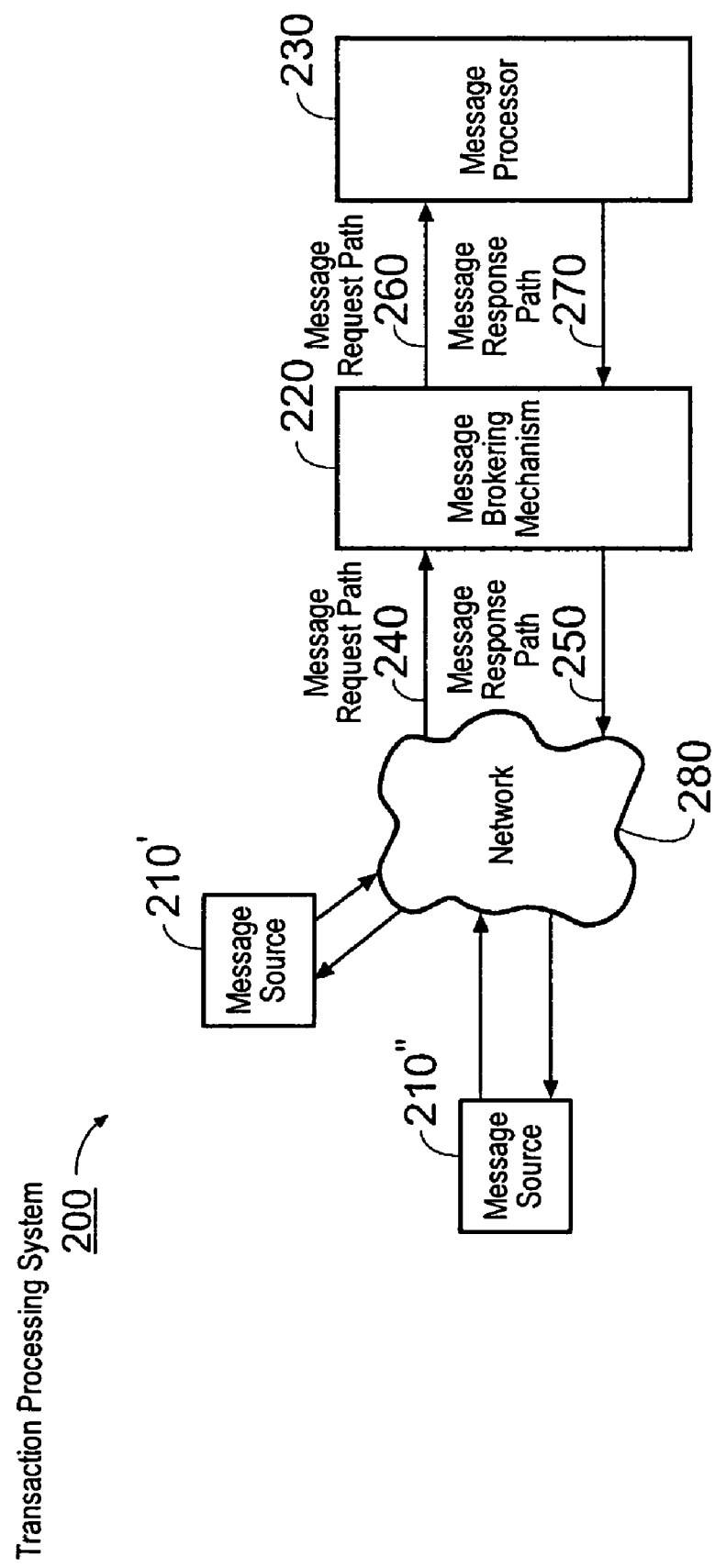
FIG. 4 shows a schematic representation of a transaction processing system comprising a message brokering mechanism.

FIG. 4 shows a schematic representation of a transaction processing system 200 comprising a message brokering mechanism 220. The transaction processing system 200 comprises at least one message source 210', 210" (two are shown for illustrative purposes only) connected to a network 280

(such as the Internet), a message brokering mechanism 220 (see the various descriptions below) connected to the network 280, and a message processor 230 connected to the message brokering mechanism 220. The message sources 210', 210" can communicate message requests to the message brokering mechanism 220 along a message request path 240 that passes over the network 280. The message sources 210', 210" can also communicate with each other over the network 280. The message brokering mechanism 220 is operable to dispatch responses to the message requests back to an originating message source, such as message source 210', along a message response path 250 that passes over the network 280. The message brokering mechanism 220 is operable to dispatch a message request received from the originating message source 210' to the message processor 230 along the message request path 260, and to receive responses from the message processor 230 along the message response path 270.

The message brokering mechanism 220 checks whether the message request it receives from the originating message source 210' already has an associated response. Where a duplicate message request is found for which there is already an associated response, that response is dispatched to the originating message source 210' along the message response path 250. The message processor 230 is thus shielded from duplicate, or repeat, requests allowing more productive use of message processor 230 processing time. Message requests which have not been dispatched to the message processor 230 previously are dispatched along the message request path 260. When the message processor 230 receives the message requests they are processed by the message processor 230. Before the message requests are processed, the message processor can acknowledge receipt of the message requests, possibly by sending a response message back to the message brokering mechanism 220 indicating that the message is being, or about to be, processed. Once the message request has been processed, the message processor sends an acknowledgement response, possibly with further data, back to the message brokering mechanism 220 along the message response path 270. The acknowledgement response can indicate whether a particular message request has been successful or not. Responses received from the processor 230 by the message brokering mechanism 220 are then sent back to the originating message source 210' along the path 250.

The following example of a transaction processing system 200 serves to illustrate how the transaction system 200 can work in practice. In this example, the originating message source 210' is a data processing apparatus (e.g. a computer, such as a client computer system 11) configured to manage payments as part of a retailer's electronic commerce web site. The retailer's data processing apparatus 210' is configured to request authorisation for payments in response to requests received over the network 280 from an operator, or user, of the message source 210" requesting the provision of goods and/or services from the retailer in exchange for payment. The message source 210" in this example is also a data processing apparatus (e.g. a computer, such as a client computer system 11) connected to the WWW as described previously. The user generates a payment request at the message source 210" through a web-browser interface by entering details of their desired purchase(s) and credit card, or other payment, details. The payment request is sent to the retailer's data processing apparatus 210' through the network 280 using a secure link.

In order to validate any particular payment request, a message request comprising the user payment details (such as account number, card expiry date, the sum to be paid, time and date information etc.) is formulated by the retailer's data processing apparatus 210'. The message request can also include trust-based hierarchically certified certificates that are used to verify the identity of the retailer and/or user with varying degrees of certainty. One way of providing trust-based certificate handling and management is to use a trust-based transaction manager (TTM), such as the iPlanet™ Trustbase™ Transaction Manager, available from Sun Microsystems, Inc.

The message request is dispatched from the retailer's data processing apparatus 210' over the message request path 240 to an appropriate banking system using a secure link. The banking system implements the message brokering mechanism 220, for example, as an add-on to a TTM operating on a transaction controller server (see FIG. 7, for example). The transaction manager and the message brokering mechanism 220 may be implemented using logic components (such as hardware, software and/or firmware modules) as part of a distributed processing system. One example of such a distributed processing system uses a symmetric multiprocessing scheme, whereby different message requests are handled by different processors to achieve load balancing in the banking system.

In another example, a server computer system 10 acts as a gateway to a banking system. Software operating on the server computer system 10 provides a first stage 221 (see FIGS. 5 to 9, for example) of the message brokering mechanism 220, and controls routing of message requests and responses to payments services implemented on the banking system, this includes any reformatting of message requests and responses that is necessary. The banking system may comprise a further private network, access to which is controlled by a private network server which may also act as a firewall for the private network. Software operating on the private network server implements the payments services and provides the second stage 222 of the message brokering mechanism 220. The payments services control the dispatch of the message requests and responses within the private network, and is operable to dispatch message requests to, and receive responses from, a message processor 230 connected to the private network. In a further example, software operating on the server computer system 10 configures it to act as both the gateway to the banking system and the private network server.

The message brokering mechanism 220 checks whether the message request it receives from the retailer's data processing apparatus 210' already has an associated response. Where the message request is a duplicate message request for which there is already an existing associated response, that existing response is dispatched to the data processing apparatus 210' along the message response path 250. Existing responses to message requests are records of message response content that have been previously received by the message brokering mechanism 220, these can be maintained in one or more databases maintained by the message brokering mechanism 220. If the message request is a duplicate message request without an associated response, the message brokering mechanism 220 sends an "in progress" message to the retailer's data processing apparatus 210' along the message response path 250 indicating that a response to the message request is not ready for transmission to the retailer's data processing apparatus 210'. A token (e.g. a short numerical data value used to reference a longer text message) indicating that any such "in progress" message has been dispatched is then recorded by the message brokering mechanism 220 in association with an identity of the message request generating it.

Where the message request is not a duplicate message request, it is dispatched by a first stage 221 of the message brokering mechanism 220 to the TTM. The TTM can be configured to provide responses to the retailer's data processing apparatus 210' through the message brokering mechanism 220 by rejecting any authorisation for payment if one or more of the user and retailer certification is not valid or is not authorised to a sufficiently high level of trust, and any such response is recorded by the message brokering mechanism 220 as a new existing response to the corresponding message request. Existing responses to message requests are records of message response content that have been previously received by the message brokering mechanism 220, these can be maintained in one or more databases maintained by the message brokering mechanism 220. If the TTM authorises the message request for transmittal to the message processor 230, it is packaged by the TTM for dispatch along the message request path 260.

The message processor 230 can be a legacy system (e.g. a mainframe computer system or other system predating the message brokering mechanism) that connects to the message brokering mechanism 220 through a private network that forms part of the banking system. In this case, the private network is used to provide both the message request path 260 and the message response path 270, and reformatting and/or repackaging of the message may be necessary in light of the architecture of the private network and/or the legacy system.

When the message request is dispatched to and/or received by the message processor 230, a message indicating that the request message is "in progress" is dispatched by the message brokering mechanism 220 to the retailer's data processing apparatus 210'. This lets the retailer's data processing apparatus 210' know that the message request is being actioned, and frees it to perform other tasks. The chance of the retailer's data processing apparatus 210' producing repeat message requests is also lessened by this action. A token indicating that the "in progress" response has been dispatched is recorded by the message brokering mechanism 220 to represent a new existing response.

When the message processor 230 has finished processing the message request, it can return one of numerous possible responses in reply to the request for payment authorisation. If the request is approved, the message processor 230 can transfer funds from the user's account to the retailer's account and send a response to the retailer's data processing apparatus 210', through the message brokering mechanism 220, indicating that the message request has been actioned. Whatever the response, it is recorded by the message brokering mechanism 220 as a new existing response. A response approving the request usually provides a transaction authorisation code to the retailer, the receipt of which will allow the retailer to provide the user with the requested goods and/or services. If the user has insufficient credit, funds etc. the request can be refused or authorised only at a lower monetary limit. A message indicating that the request has been refused, or conditions under which a transaction would be possible, is dispatched from the message processor 230 to the message brokering mechanism 220 and then back to the retailer's data processing apparatus 210'. The retailer's data processing apparatus 210' then informs the message source 210" of the outcome of the request by dispatching a further message across the network 280.

Figure 5:
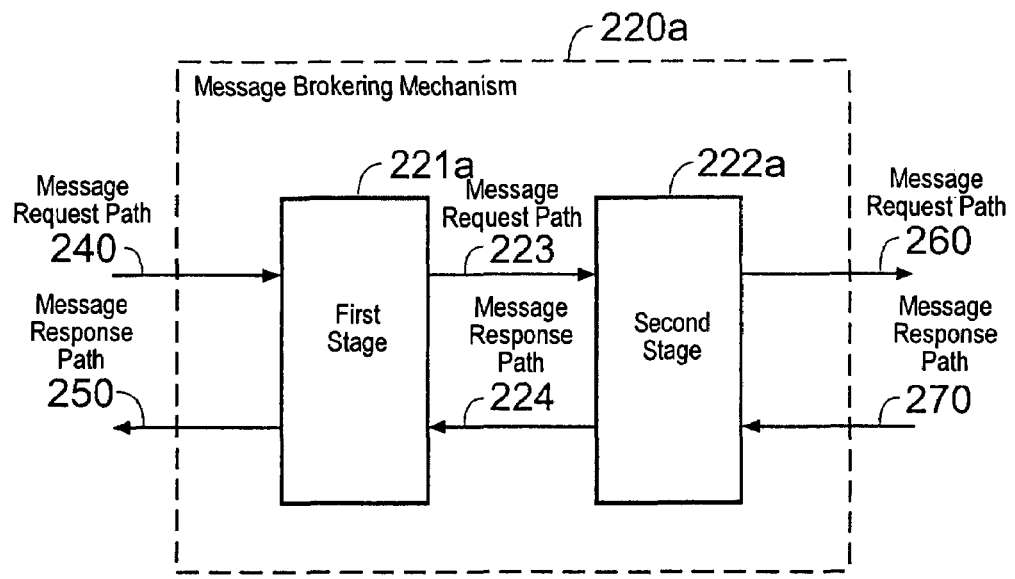
FIG. 5 shows a schematic logical representation of a message brokering mechanism.

FIG. 5 shows a schematic logical representation of a message brokering mechanism 220a. The message brokering mechanism 220a comprises a first stage 221a and a logically separate second stage 222a. The first stage 221a is configured to accept message requests from a message request path 240 and to dispatch responses to such message requests to a message source along a message response path 250. The first stage 221a is operably coupled to the second stage 222a. Message requests can be sent from the first stage 221a to the second stage 222a along a message request path 223. Responses to message requests can be sent to the first stage 221a from the second stage 222a along a message response path 224. The second stage 222a is configured to accept message responses from a message response path 270 and to dispatch message requests received from the first stage 221a along a message request path 260.

The first stage 221a receives message requests from the message request path 240 and checks whether the message request has been previously received by the first stage 221a. In a particular embodiment, the check is performed by calculating a message digest (sometimes referred to as a "hash") from the message request and comparing it to a database of message digests recorded for all previously received non-duplicate message requests. Where there is no match, the new message digest is stored in the database of message digests and the message request is dispatched to the second stage 222a. Where there is a match, the first stage 221a checks whether there is an existing response to the message request that has been previously received by the first stage 221a. This check can be performed, for example, by using the message digest to index a database table having responses (or indicators of responses such as, for example, a token representing the "in progress" state) as table entries. If the database entry indexed by the message digest contains an existing response, that response is dispatched along the message response path 250. Other checks may be employed, such as checking for unique identifiers assigned to each message.

In one example embodiment, the second stage 222a compares the message digest to entries in a second database. The second stage 222a dispatches any responses to repeat requests back to the first stage 221a along the message response path 224. Non-repeat message requests are logged in the second database and dispatched along the message request path 260 for processing. Responses received by the second stage 222a are logged in the second database with their associated message digest acting as an index. Thus, this embodiment provides two-stage screening in which both stages screen their respective out-going message request paths 223, 260 from repeat message requests.

Either one or both of the first and second stages 221a, 222a may be configured to dispatch a message indicating that a request is "in progress". To do this the respective stage may check the respective database entry corresponding to the message digest. Where a matching message digest is found for which there is no database entry corresponding to the message digest, an "in progress" message can be generated for dispatch and a token representing the message entered into the corresponding database entry. Should the same message database entry be accessed thereafter, the token indicates that an "in progress" response has already been sent. The tokens can be overwritten with the content of any further responses received, such as a final response received once processing of the corresponding message request is complete.

Message responses are dispatched along the message response paths 224, 250, 270 along with an identifier that enables the stages and the message source to identify which message request produced the response. The identifier may be a message digest of the original message request appended to the message response.

The first stage 221a and the second stage 222a can be implemented as logic modules using any one or more of hardware, software and firmware components or modules (as will be appreciated by those skilled in the art). Some example embodiments are discussed above. In one example embodiment, the first stage 221*a* is implemented in firmware as part of a handheld communications device, the message request path 223 and message response path 224 form part of a wireless telecommunications link, and the second stage 222*a* is implemented in software and forms part of a telecommunications message handling service in a receiving station. In another example embodiment, the first and second stages 221*a*, 222*a* are implemented by co-operating software services, operating on a distributed symmetric multiprocessing system. In a further example embodiment, the first stage 221*a* is implemented as a software service (e.g. executing on a data processing apparatus) on the outside of a firewall server and the second stage 222*a* is implemented as a software service within the firewall server. This latter embodiment allows repeat messages request to be handled by the first stage 221*a* without them re-entering a firewall secured area.

Figure 6:
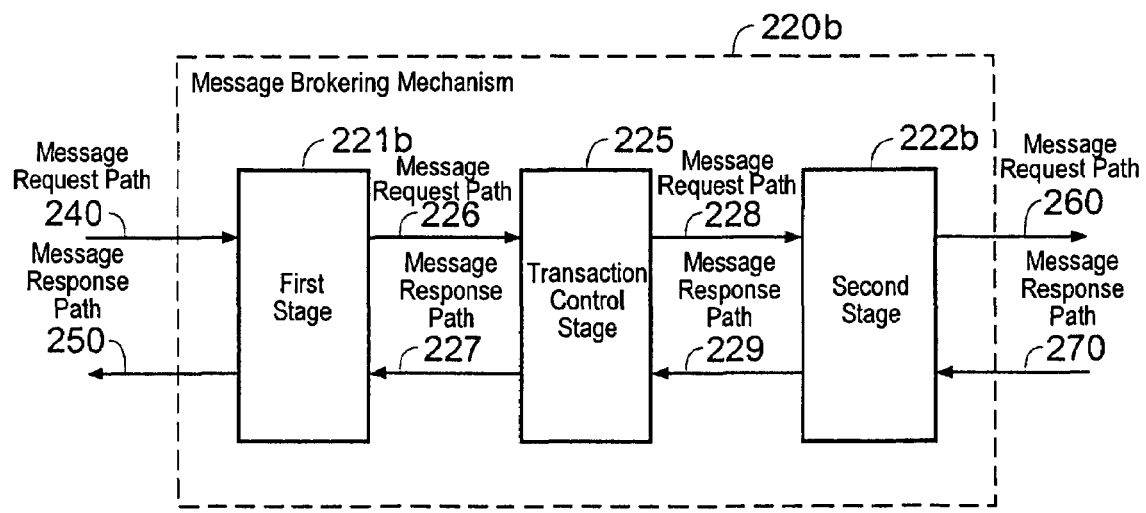
FIG. 6 shows a schematic logical representation of a message brokering mechanism.

FIG. 6 shows a schematic logical representation of a message brokering mechanism 220*b*. The message brokering mechanism 220*b* comprises a first stage 221*b* that communicates with a logically separate second stage 222*b* through a transaction control stage 225. The first stage 221*b* is configured to accept message requests from a message request path 240 and to dispatch responses to the message requests to a message source along a message response path 250. The first stage 221*b* is functionally coupled to the transaction control stage 225. Message requests can be sent from the first stage 221*b* to the transaction control stage 225 along a message request path 226. Responses to message requests can be sent to the first stage 221*b* from the transaction control stage 225 along a message response path 227. The transaction control stage 225 is functionally coupled to the second stage 222*b*. Message requests can be sent from the transaction control stage 225 to the second stage 222*b* along a message request path 228. Responses to message requests can be sent to the transaction control stage 225 from the second stage 222*b* along a message response path 229. The second stage 222*b* is configured to accept message responses from a message response path 270 and to dispatch message requests received from the transaction control stage 225 along a message request path 260.

The first and second stages 221*b*, 222*b* can function in identical ways to the various first and second stages 221*a*, 222*a* described above in connection with FIG. 5. However, the interposition of the transaction control stage 225 provides the message brokering mechanism 220*b* with extra functionality. In one embodiment, the transaction control stage comprises a TTM that provides message authentication and security functions through the screening of message requests, responses and certificates. The TTM may also provide transport functions such as reformatting or tunnelling of message requests and responses in order that communication can be achieved with legacy systems and/or networks, such as, for example, those often found in conventional banking systems. The TTM may also be included as part of the banking system.

Figure 7:
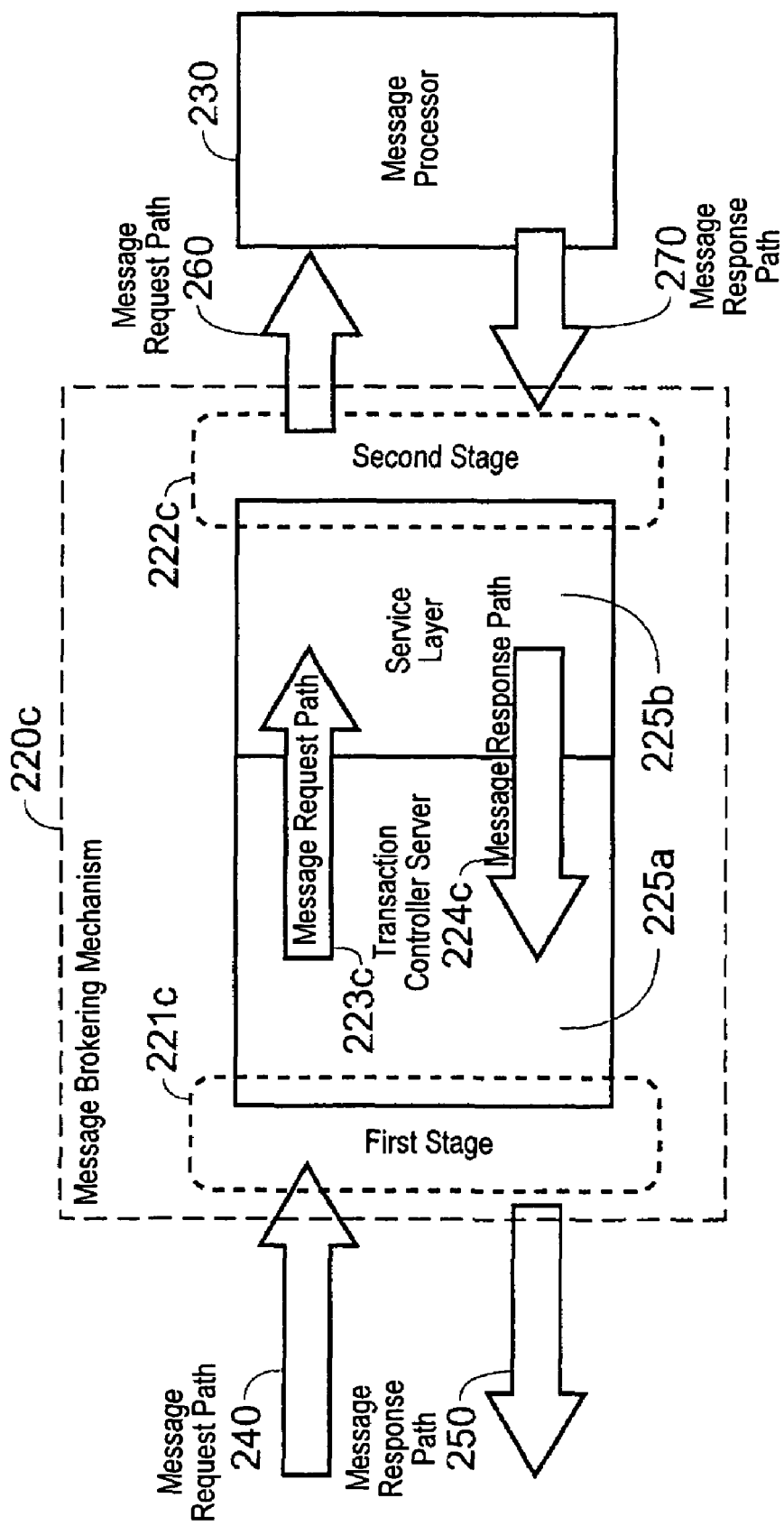
FIG. 7 shows a schematic logical representation of a message brokering mechanism in communication with a message processor.

FIG. 7 shows a schematic logical representation of a message brokering mechanism 220*c*, in communication with a message processor 230. The message brokering mechanism 220*c* is similar to the message brokering mechanism 220*b* shown in FIG. 6 and described above.

The first stage 221*c* communicates message requests and responses to the second stage 222*c* through a transaction control mechanism comprising a transaction controller server 225*a* configured to use a service layer 225*b*. The second stage 222*c* is operable to dispatch message requests to the transaction processor 230 along the message request path 260, and to receive responses from the transaction processor 230 along the message response path 270.

The transaction controller server 225*a* is a platform (which may be implemented as services, modules, plug-ins, personalities, extensions etc. operating on a processing system that may be a distributed system) that provides transport, authentication and security functions. In a further embodiment, the transaction controller server 225*a* is part of services provided by a TTM which communicates over a private banking network with the message processor 230 using payment services implemented as part of the service layer 225*b*. Responses generated by the message processor 230 are sent by the second stage 222*c* via the service layer 225*b* to the transaction controller server 225*a*. The transaction controller server 225*a* may add authentication certificates to the responses before dispatching them to respective message sources via the first stage 221*c*.

Figure 8:
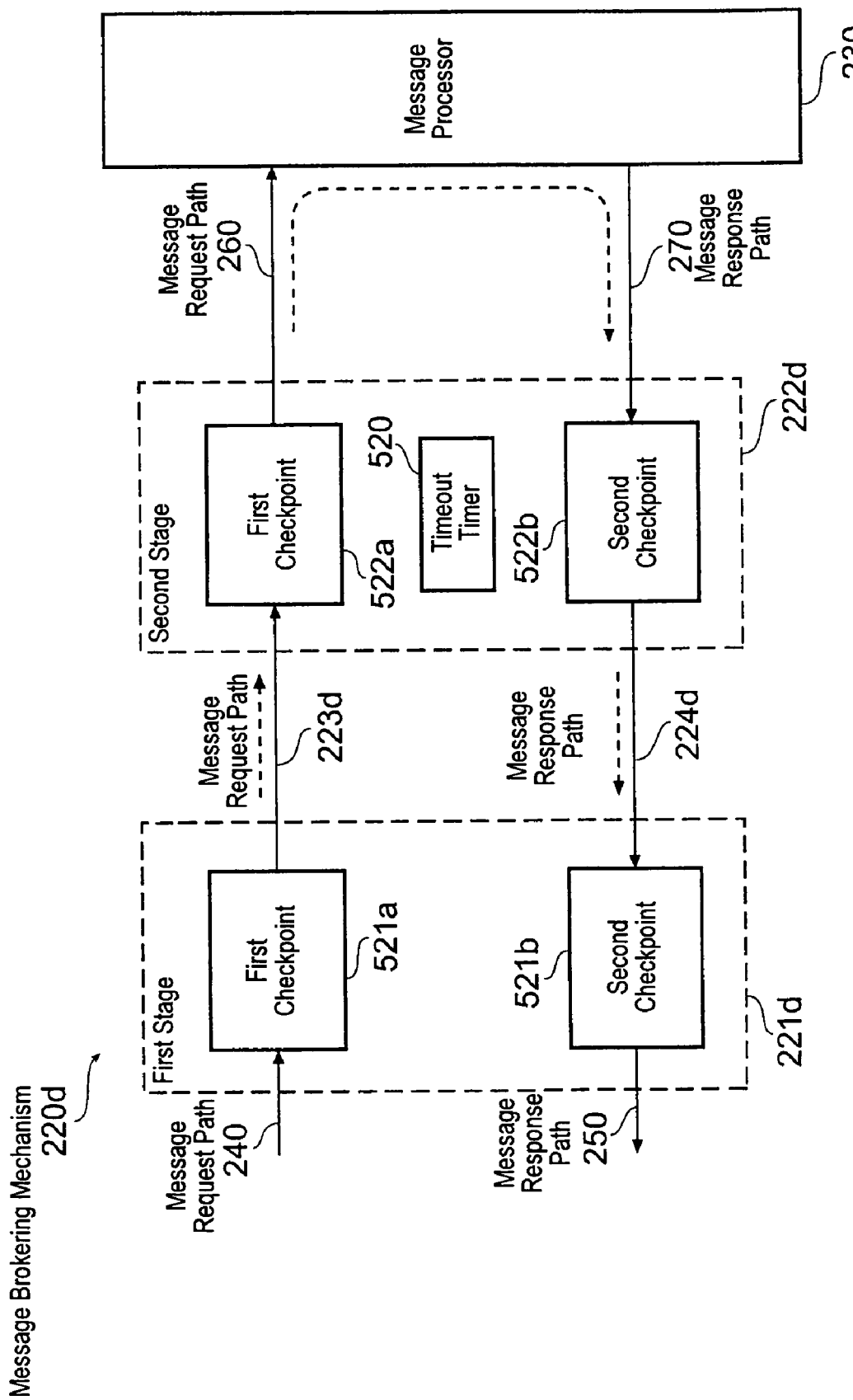
FIG. 8 shows a schematic logical representation of a message brokering mechanism in communication with a message processor.

FIG. 8 shows a schematic logical representation of a message brokering mechanism 220*d* in communication with a message processor 230. The message brokering mechanism 220*d* is similar to that shown in FIG. 5, except that the second stage 222*d* is provided with extra functionality to implement a process for checking for and automatically reinstating message requests that are lost by the message processor 230.

First stage 221*d* and second stage 222*d* comprise respective first and second checkpoints 521*a*, 521*b*, 522*a*, 522*b*. The first checkpoints 521*a*, 522*a* denote logical points in the message brokering mechanism 220*d* where a check can be performed to determine whether a particular message request has been received previously. The second checkpoints 521*b*, 522*b* indicate logical points in the message brokering mechanism 220*d* where a check can be performed to determine whether a response to a particular message request has been received previously. In one embodiment the checks are performed by calculating a message digest of the particular message request and comparing it to a database of message digests recorded for all previously received non-duplicate message requests.

When the second stage 222*d* receives a message request that has not been received previously at checkpoint 522*a* the message request is dispatched to the message processor 230. The second stage 222*d* then starts a timeout timer 520 to monitor the time elapsed since the message request was received. If the second stage 222*d* receives a response from the message processor 230, then that response is checked to determine whether it is an actioned response sent as a final response to the message request. For example, an actioned response may indicate that a payment has been made from one account to another, whereas a non-actioned response may indicate that the payment is still awaiting authorisation. When an actioned response is received the timeout timer 520 is instructed to stop monitoring the elapsed time for the message request.

If the timeout timer 520 is allowed to run for a predetermined time period, indicating a timeout event, it indicates to the second stage 222*d* that a timeout event has occurred and identifies the message request for which that timeout event has occurred. The second stage then dispatches a query message to the message processor 230 requesting the message processor 230 provide further information regarding the message request. If no response to the query message is received within a fixed time period, the second stage 222*d* logs a request message identifier in a database to await administrator processing or restart. When the message processor 230 receives a query response it checks the identity of the message request and formulates a query reply for sending back to the second stage 222*d*.

Query replies are formulated according to whether the message request has been received previously by the message processor 230. If the message request has been received before and an actioned response generated, the actioned response is dispatched to the second stage 222d in the query reply. If the message request has been received before but no actioned response has been generated, the query reply instructs the second stage 222d to reset the timeout timer 520. This effectively instructs the second stage 222d to wait for another predetermined time period before checking any further whether an actioned response has been generated by the message processor 230. If the message request has not been received previously by the message processor 230 (e.g. as indicated by the content of a query reply indicating that the message request has never been received by the message processor 230), the message request is deemed lost and can be dispatched again from the second stage 222d to the message processor 230.

Query response information is extracted from the query responses and used by the second stage 222d to provide idempotent functionality to the first stage 221d in a similar manner to the message brokering mechanism of FIG. 5.

In various embodiments a repeat of a lost message request is sent in a further query message from the second stage 222d to the message processor 230. This has the benefit that the repeat message request is supplied to the message processor through a channel that is known to be reliable.

In various embodiments the query message and any query reply are routed over at least one physical path separate from the message request path 260 (e.g. a dedicated communications link) and the message response path 270. This enables the second stage 222d to have a higher probability of being able to interrogate the message processor 230 should the cause of a lost message request be due to the failure of one or more of the message request path 260 and the message response path 270.

In various embodiments the timeout timer 520 is implemented by a process thread that returns a unique identifier identifying the message request after the predetermined time period, such as, for example, 30 seconds. The second stage 222d also records an indication of the time at which the message request was received along with a corresponding message digest identifying the message request in a database.

Figure 9:
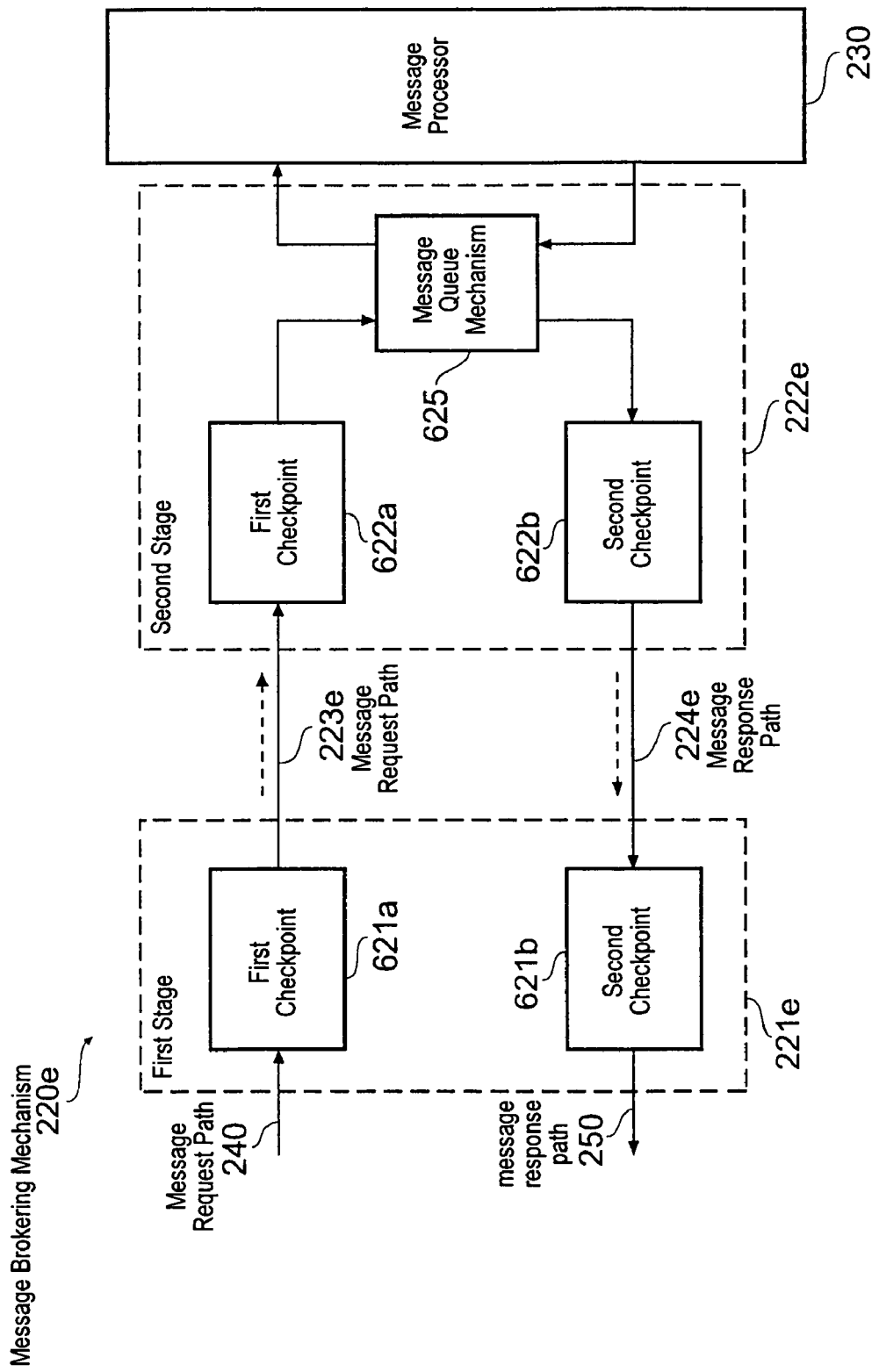
FIG. 9 shows a schematic logical representation of a message brokering mechanism in communication with a message processor.

FIG. 9 shows a schematic logical representation of a message brokering mechanism 220e in communication with a message processor 230. The message brokering mechanism 220e comprises a first stage 221e and a second stage 222e. The message brokering mechanism 220e is similar to that shown in FIG. 5 except that the second stage 222e directs message requests and message responses through a message queue mechanism 625.

The message queue mechanism 625 monitors message requests and responses sent between the second stage 222e and the message processor 230. The message queue mechanism 625 checks if a response is received for a message request within a fixed time period. When no such response is received, the message queue mechanism 625 resends the message request to the message processor.

This message brokering mechanism may be used where the message processor 230 is a reliable transactional system.

Figure 10:
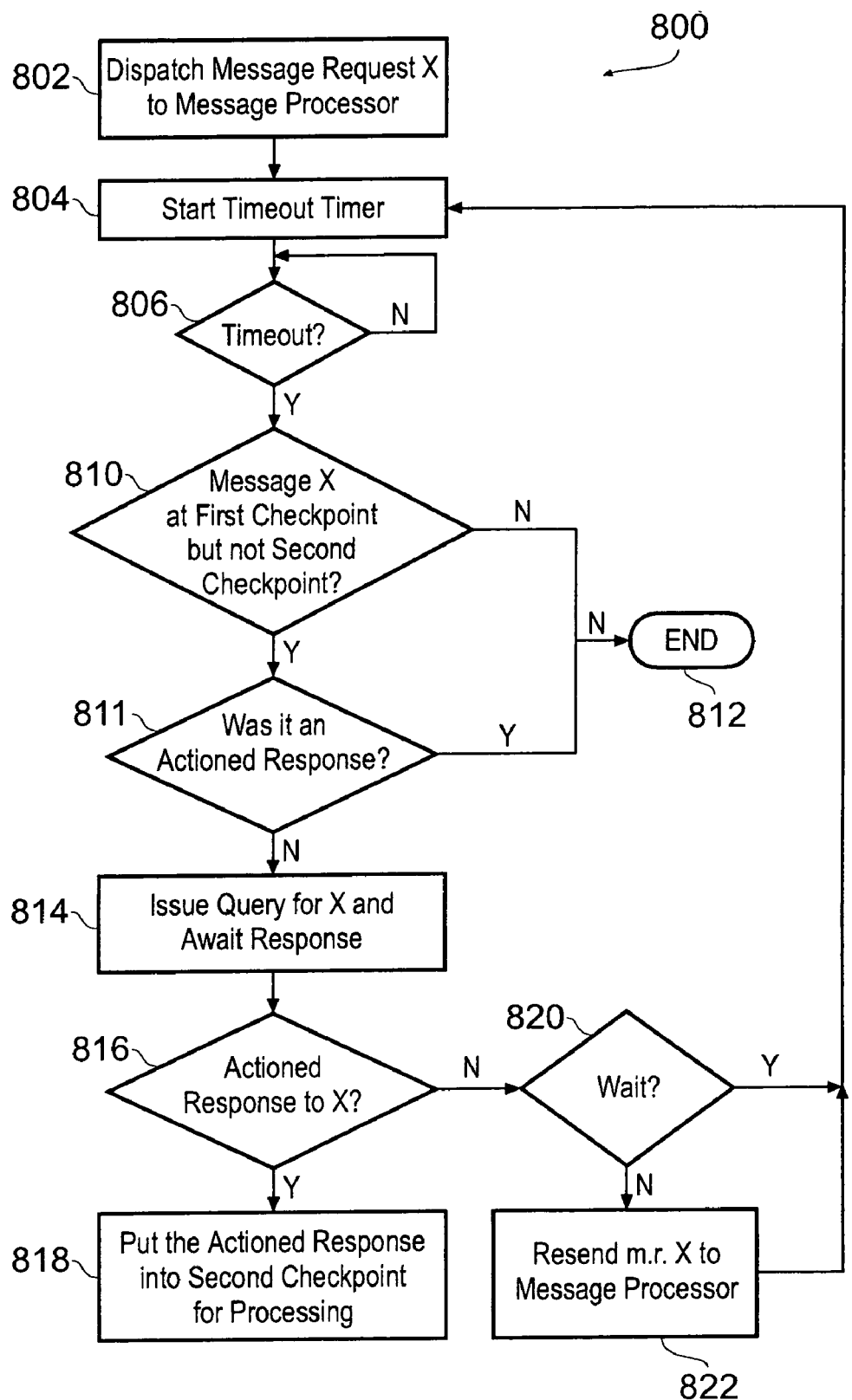
FIG. 10 shows a flowchart showing a process for checking for and automatically reinstating message requests lost by a message processor.

FIG. 10 shows a flowchart showing a process 800 for checking for and automatically reinstating message requests lost by a message processor 230. This method may, for example, be implemented by a thread, object or modular component of a computer program operating on one or more computer system used to provide a message brokering mechanism according to aspects of the invention. For example, the process 800 may be implemented by the message brokering mechanism 220d shown in FIG. 8.

The process 800 monitors the dispatch of a message request (e.g. a message request denoted by X) to a message processor 802. A timeout timer process 804 is begun that indicates the elapsed time period since the message request was received. The process then loops 806 (waits) until it is either terminated by an external process (such as, for example, killed by an operating system command) or until it has been running for a predetermined time period, thereby indicating that a timeout event has occurred.

Where a timeout event does occur, the process checks (at 810) whether the message request has been sent to the message processor but no actioned response received. To perform this step a comparison may be made between the records held at first and second logical checkpoints that hold logs of all request and response message traffic that passes through those checkpoints 811. Where the comparison reveals that there is an actioned response corresponding to the message request, the process terminates 812.

If the comparison reveals that there is no actioned response corresponding to the message request, the process proceeds to formulate a query message (at 814) that can be used to interrogate the message processor. The query message requests that the message processor provide further information regarding the message request. If no response to the query message is received within a fixed time period, the process logs a request message identifier in a database and signals that the message request cannot be automatically reinstated.

When the message processor responds to the query, the content is checked. A check is made 816 to determine whether there is already an actioned response corresponding to the message request. If there is such a response it is extracted from the query response 818 and dispatched to the second logic checkpoint so that its existence may be recorded and subsequently the message response forwarded on. Where there is no actioned response, the process checks 820 the content of the query response to determine if the message processor requires it to wait.

If a wait state is indicated by the query response, the timeout timer is reset and the process continues from step 804. If no wait state is indicated the message request is resent (at 822) to the message processor and the process then continues from step 804.

Figure 11:
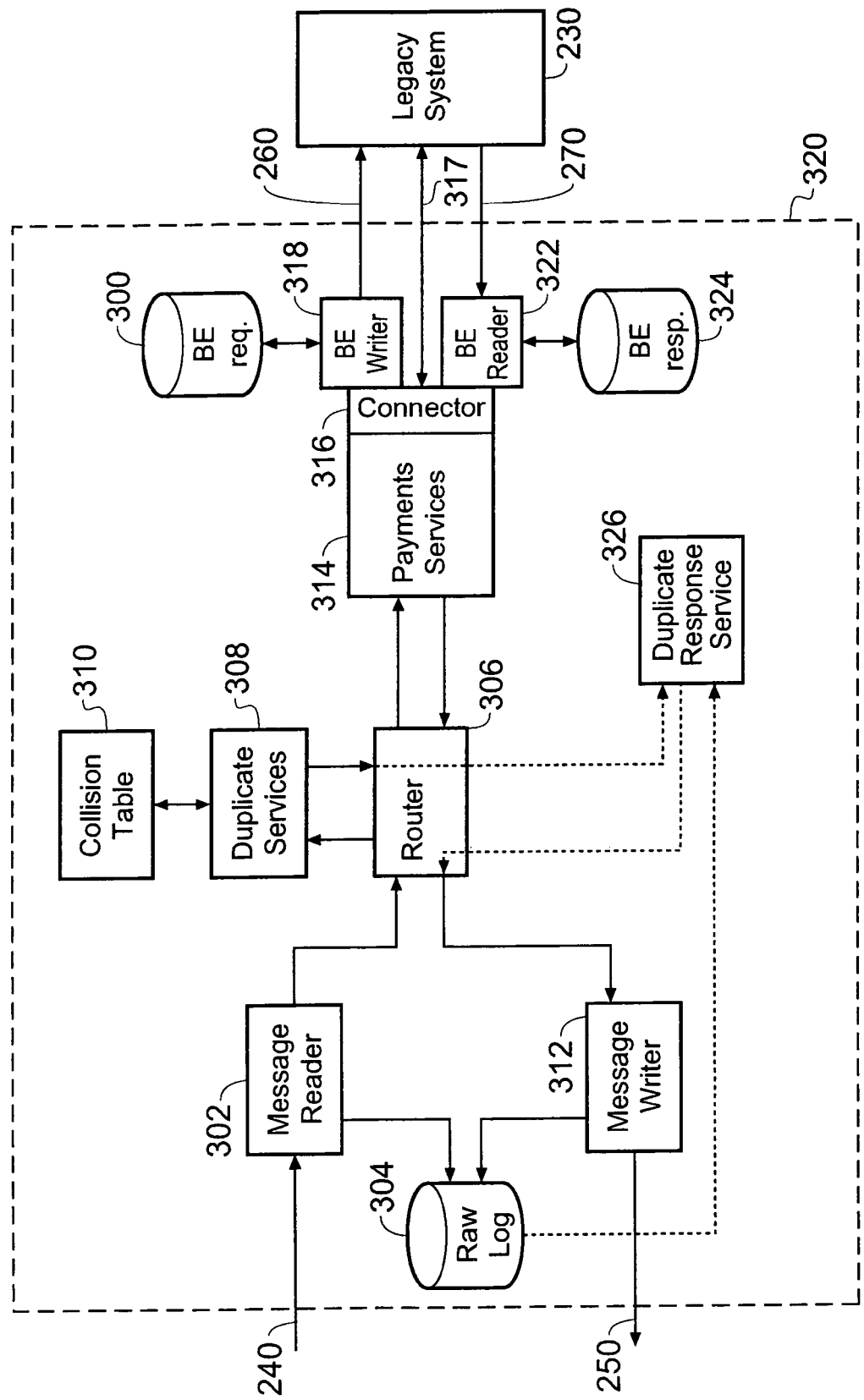
FIG. 11 is a system architecture diagram showing an implementation of the message brokering mechanism according to an embodiment of the present invention.

FIG. 11 is a system architecture diagram showing an implementation of a message brokering mechanism 320 according to an embodiment of the present invention. For example, the architecture can be used to implement any of the message brokering mechanisms shown in FIGS. 3 to 9. The message brokering mechanism 320 can also be used to implement a process for checking for and automatically reinstating message requests lost by a message processor, such as that illustrated in FIG. 10.

A message reader service module 302 receives an incoming message request from message request path 240 and sends a copy of the message request to a raw log database 304 for recordal. The raw log database 304 is a structured query language (SQL) database that is used to record all incoming and outgoing data traffic, including message requests and outgoing responses, along with system time and date information. The raw log database 304 can be configured to check for certain types of entry duplication and may also be used for system administration and auditing purposes.

The message reader service module 302 forwards the message request to a router 306. The router 306 then directs the message request to a duplicate services module 308. The duplicate services module 308 can control one or more processes operating on a distributed processing system. Each of these processes can be used to check incoming message requests for duplicates. Where distributed processing is used, the duplicate services module 308 selects an appropriate process to perform the check according to load balancing information collected by the duplicate services module 308 from the distributed services. The duplicate services module 308 dispatches message requests to the least busy process. The process generates a message digest from the message request and checks the message digest against message digest entries of previously received message requests held in a collision table 310. The collision table 310 is a data table to which all the distributed processes have read access, and is maintained centrally by the duplicate services module 308.

Where there is no match between the message request and the records in the collision table 310, the message digest of the message request is written into the collision table 310. An attribute of the message request indicating whether the message request is a duplicate is set to be clear, and the message request dispatched back to the router 306. The router 306 receives the message request and determines from the attributes that the message request is not a duplicate. The message request is then dispatched to a payments services module 314.

The payments services module 314 forms part of a service system for managing payment transactions over a private network. When the message request is received by the payments services module 314 it may be reformatted according to the protocol of the private network, if the private network protocol differs from the protocol used to route the message request to the payments services module 314. The message request is then dispatched through connector services 316 to backend writer services module 318. The payment services module 314 can also manage processes (such as, for example, that illustrated in FIG. 10) for checking for and reinstating lost messages. Further, the payment services module 314 may provide certificate validation and certification services when used in a trust-based payments system.

The backend writer module 318 creates a message digest from the message request and checks an SQL backend request database 300 for any matching message digests that indicate duplicate message requests. Where there is no match indicating a duplicate message request, the backend writer 318 writes the message digest into the backend request database 300 and dispatches the message request along the message request path 260 to the message processing system 230. At this time the payments services module 314 also starts a unique monitor processing thread identifiable by the message digest. Monitor processing threads are described in more detail below in conjunction with checking for and reinstating lost messages. The message processing system 230 can be a banking legacy system, which processes all message requests that it receives.

Once the message processing system 230 has processed the message request, it sends a response, including a message request identifier such as a digest of the message request, along the message response path 270 to a backend reader service module 322. The backend reader service module 322 stores the response in an SQL implemented backend response database 324 and dispatches the response through the connector services 316 to the payments services module 314. The backend response database 324 is logically distinct from the backend request database 300, but the databases 300, 324 may share common data entries.

The payments services module 314 determines whether the response is an actioned response issued in final settlement of the message request by comparing the response held to a list of all possible message responses that are known to be actioned responses. Where an actioned response is found, the payments services module 314 issues a command that causes the unique monitor processing thread to be terminated. E.g. a UNIX™ based operating system may be issued with a "kill-9 xxx" command to terminate the process having process number "xxx".

The payments services module 314 may reformat the response and/or add a validation certificate before dispatching the response to the router 306. Router 306 dispatches the response to a message writer service 312. The message writer service 312 records the response in the raw log database 304 and dispatches the response back to the message source along the message response path 250. The message writer service 312 is configured to record all responses it receives in the raw log database 304, so that the raw log database 304 maintains an accurate sequential record of all the responses sent.

For the case where the backend writer module 318 determines that there is a match indicating a duplicate message request, the backend writer module 318 sets a transport attribute of the message request and dispatches the message request through the connector services 316 to the backend reader module 322. The backend reader module 322 recognises that the transport attribute is set and calculates a message digest from the message request. A check is then performed by the backend reader module 322 in the backend response database 324 for matching message digests. If no match is found a new response indicating that the message request is "in progress" is generated. If a match is found the existing response is copied from the backend response database 324 to form the new response. The new response is then dispatched to the message source in the same way as is described above for responses generated by the message processor 230.

For the case where the duplicate services module 308 determines that there is a match between the message request and a record in the collision table 310, the attribute of the message request indicating whether the message request is a duplicate is set, and the message request dispatched back to the router 306. The router 306 dispatches the message request to a duplicate response service module 326. The duplicate response service module 326 checks the raw log database 304 for any existing response to the message request. If there is at least one existing response, the duplicate response service module 326 sends the most recent response as a new response to the router 306 for dispatch to the message writer service 312. If there is no existing response, the duplicate response service module 326 sends a new response indicating that the message request is "in progress" to the router 306 for dispatch to the message writer service 312. The message writer service 312 records the new response in the raw log database 304 and then dispatches it to the message source along the message response path 250 to the message source.

As indicated above, the payments services module 314 starts a unique monitor processing thread identifiable by the message digest of the message request. The monitor processing thread is a stand alone process that is executed under the control of a computer operating system capable of handling multiple threads, such as, for example, a UNIX™ operating system. A unique monitor thread process identification number (PID), assigned by the operating system when the thread is initialised, is correlated with the message digest to enable the payments services module 314 to identify the monitor processing thread corresponding to any particular message request.

Once the monitor processing thread has been initialised it starts to monitor the time elapsed since its creation and compares this time to a predetermined time period set by the payments services module 314. This predetermined time period may be determined in advance by a system administrator and/or vary in accordance with the request message content and/or message processor type. This monitoring process continues until it either times out or the monitor processing thread is terminated by the operating system. If the monitor processing thread encounters a timeout event, it notifies the operating system by way of an interrupt event and then terminates itself. The operating system then notifies the payments services module 314 that a monitor processing thread has timed out and provides the payments services module 314 with the PID of that thread. From the PID the payments services module 314 can identify the message request for which the monitor processing thread has timed out.

Once notified of a timed out message request, the payments services module 314 interrogates the backend reader module 322 and backend writer module 318 to determine whether there are entries in the backend request database 300 and/or the backend response database 324 corresponding to the message request. If the backend writer module 318 indicates that it has not received the message request but the backend reader module 322 indicates that it has received the message request, this could indicate that there is a problem with the backend request database 300. If the backend writer module 318 indicates that it has not received the message request and the backend reader module 322 also indicates that it has not received the message request, this could indicate that there is a problem with the backend databases 300, 324 and/or connector services 316. In both cases, where the backend writer module 318 indicates that it has not received the message request, the payments services module 314 can generate a user/administrator notification message indicating that there is a problem that needs to be addressed and one or more possible cause.

If the backend writer module 318 has received the message request, the payments services module 314 determines whether an actioned response has been issued to the backend reader module 322 in final settlement of the message request. The payments services module 314 checks to determine whether the message response is an actioned response by comparing the response held in the backend response database 324 to a list of all possible message responses that are known to be actioned responses. Where an actioned response is found it is dispatched by the payments services module 314 to the router 306 for forwarding on. If this happens, payments services may formulate a system administrator message indicating that there might be a problem with connector services 316.

Should there be no response or no actioned response at the backend reader module 322, the payments services module 314 formulates a query message using a structured query language (SQL) protocol. The query message contains a message digest for the message request. The query message is dispatched to the connector services module 316 for forwarding on to the message processor 230 over a query path 317. The query message instructs the message processor 230 to provide any information it has regarding the message request.

The message processor 230 formulates an SQL query response containing a response to the query message and dispatches it to the payments services module 314 over the query path 317 through connector services 316. The query response may indicate that the message request was never received by the message processor 230. In this case, the payments services module 314 formulates a further query message that contains the message request and dispatches it to the message processor 230. Upon receipt of the further message request, the message processor 230 extracts the message request and places it into a queue to await processing. The message processor 230 dispatches a further query response to the payments services module 314 instructing it to initialise a new monitor processing thread corresponding to the message request. In this way, a timeout timer is effectively reset and processing of the message request is continuously monitored.

If the message request has been received previously by the message processor 230, the message processor 230 may formulate a number of query responses for dispatch to the payments services module 314 over the query path 317 via connector services 316. Where the message request is already in a queue for processing, the message processor 230 formulates an SQL query response that instructs the payments services module 314 to wait. Upon receipt of such a query response, the payments services module 314 initialises a new monitor processing thread corresponding to the message request.

Other query responses may be issued by the message processor 230 to control the operation of the payments services module 314. For example, the query response may indicate that the message request has been received and/or provide results of any processing performed by the message processor 230. The payments services module 314 may act in dependence on the content of the query responses, such as, for example, by generating a message containing the content and dispatching it via the router 306 to a statistical analysis module (not shown) that gathers statistics for system analysis/administration purposes.

Figure 12:
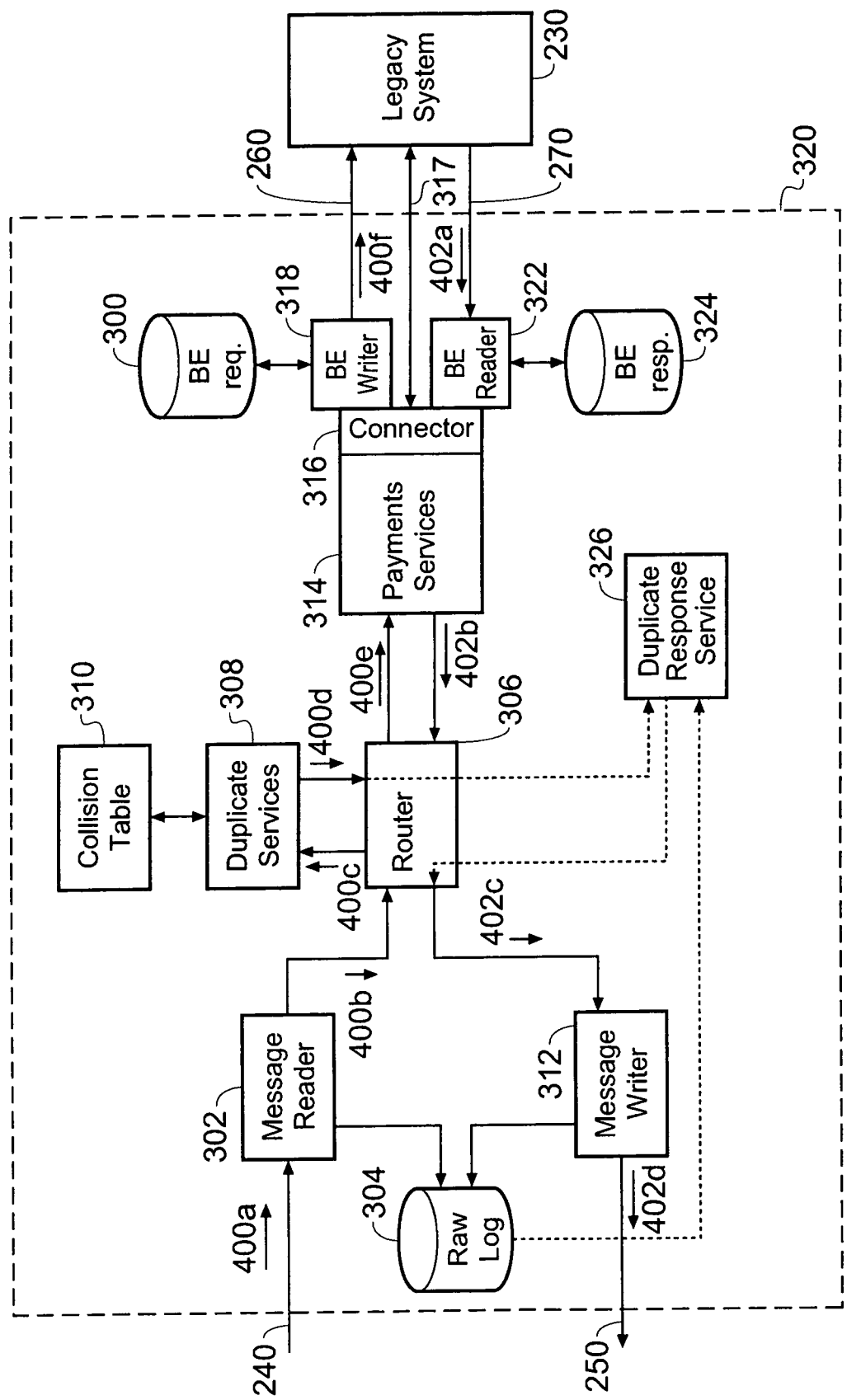
FIG. 12 shows the flow of a message request and response in a message brokering system according to the embodiment of FIG. 11.

FIG. 12 shows the flow of a message request 400 and response 402 in the message brokering system 320 of FIG. 11, when the request is processed by the message processor 230. The message request position (400*a*-400*f*) is represented sequentially in the message brokering system 320 by the suffix letters a-f. The response position (402*a*-402*d*) is represented sequentially in the message brokering system 320 by the suffix letters a-d.

Message reader service module 302 is shown receiving a message request 400*a* along the message request path 240. On receiving the message request 400*a*, the message reader service module 302 performs the step of sending a copy of the message request 400*a* to the raw log database 304 to be recorded. The message reader service module 302 handles the message request 400*b* by forwarding it to the router 306. The router 306 performs a forwarding operation by sending the message request 400*c* to the duplicate services module 308.

The duplicate services module 308 can control one or more processes operating on a distributed processing system. Where load balancing is used, the duplicate services module 308 implements a checking process to determine which of the processes can best deal with the message request 400*c*. The duplicate services module 308 performs the step of forwarding the message request 400*c* to the selected process. The process generates a message digest from the message request 400*c* and performs the step of checking the message digest against message digest entries of previously received message requests 400 held in the collision table 310. In this example no match is found and so the process sends the message request 400*d* back to the duplicate services module 308 along with an attribute indicating that the message request 400*c* is not a duplicate message request. The process performs the step of writing the message digest into the collision table 310.

Upon receiving the message request 400*d* and the indicator attribute, the router 306 checks the indicator attribute. On determining that the message request 400*d* is not a duplicate, the router 306 performs the step of dispatching the message request 400*e* to the payments services module 314.

The payments services module 314 forms part of a service system for managing payment transactions over a private network. Upon receiving the message request 400e the payments services module 314 may perform the step of reformatting the message request 400e according to the protocol of the private network. Payments services performs the step of dispatching the message request 400e through the connector services 316 to the backend writer services module 318. Payment services may also provide steps to invoke certificate validation and certification services when used in a trust-based payments system.

On receiving the message request 400e, the backend writer service module 318 performs the steps of creating a message digest from the message request and checking the SQL backend request database 300 for any matching message digests indicating duplicate message requests. In this example, the matching process provides no match indicating a duplicate message request, so the backend writer 318 performs the steps of writing the message digest into the backend request database 300 and dispatching the message request 400f along the message request path 260 to the message processing system 230.

Once the message processing system 230 has performed the steps necessary to process the message request, it performs the step of sending a response 402a, including a message request identifier such as a digest of the message request, along the message response path 270 to a backend reader service module 322. The backend reader service module 322 performs the steps of storing a copy of the response 402a in an SQL implemented backend response database 324 and dispatching the response 402a through the connector services 316 to the payment services module 314.

The payment services module 314 may perform a reformatting operation on the response 402a and/or an operation adding a validation certificate(s) before dispatching the response 402b to the router 306. Router 306 performs a dispatch operation sending the response 402c to the message writer service 312. The message writer service 312 performs an operation recording a copy of the response 402c in the raw log database 304 and another operation dispatching the response 402d back to the message source along the message response path 250. The message writer service performs an operation recording all responses 402 it receives in the raw log database 304, so that the raw log database 304 maintains an accurate sequential record of all the responses 402 that are sent.

Figure 13:
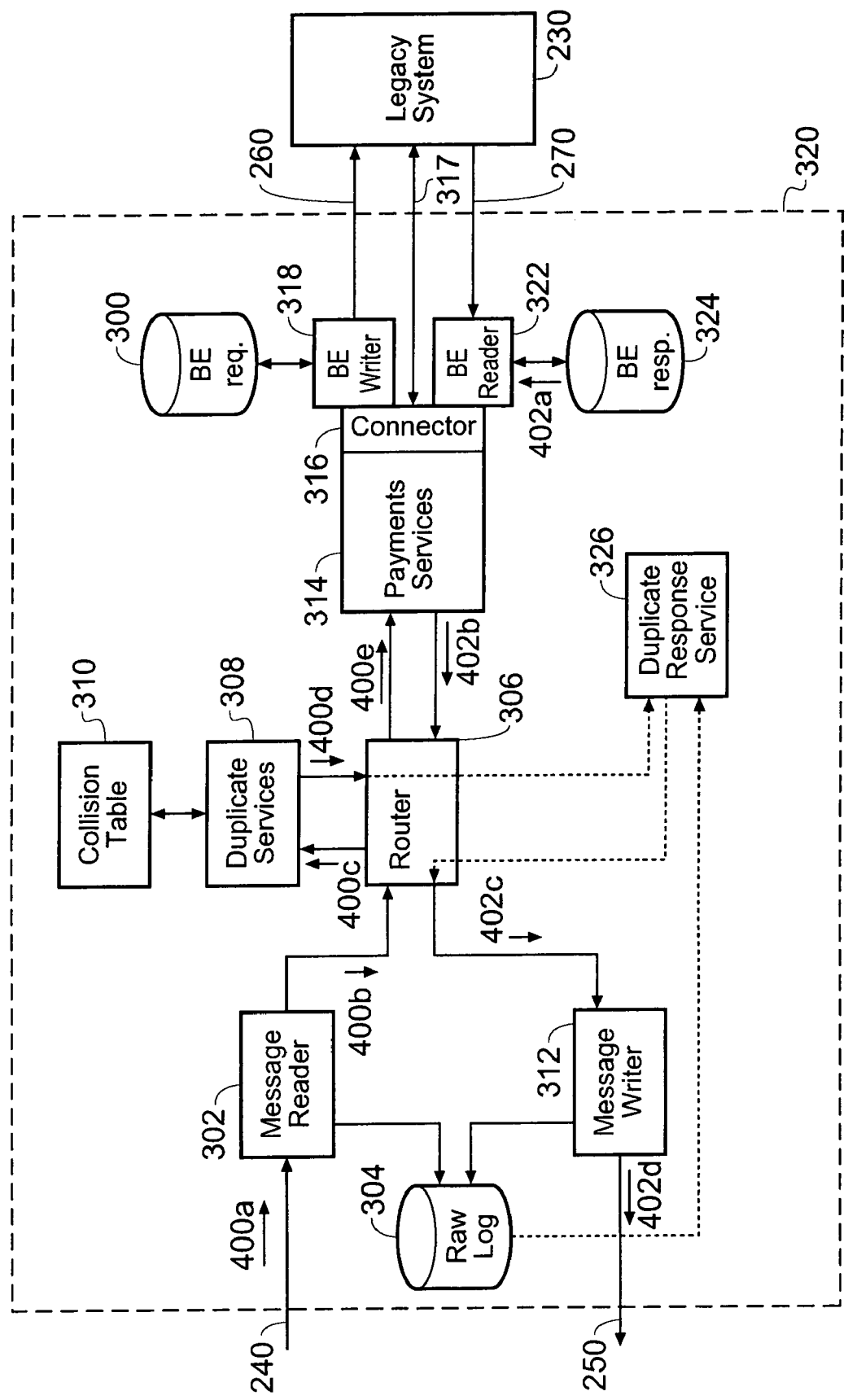
FIG. 13 shows the flow of a message request and response in a message brokering system according to the embodiment of FIG. 11.

FIG. 13 shows the flow of a message request 400 and response 402 in the message brokering system 320 of FIG. 11, when the request is screened by the second stage of the message brokering system 320. The message flow and processing steps are essentially the same as those in FIG. 12 up to the point where the backend writer module 318 receives the message request 400e from payments services 314. On checking the message digest of the message request 400e the backend writer module 318 determines there is a matching previously received message request.

The backend writer 318 performs the steps of setting a transport attribute of the message request 400e and dispatching the message request 400e through the connector services 316 to the backend reader module 322. The backend reader module 322 recognises that the transport attribute is set and performs the step of calculating a message digest from the message request 400e. Of course, the backend reader module 322 may receive the message digest calculated by the backend writer module 318 instead of the whole message request 400e as part of a transport request. The backend reader module 322 performs a checking operation in the backend response database 324 for matching message digests. If a match is found the existing response 402a is copied from the backend response database 324 to form the new response. If no match is found a timer process is started by the backend reader module 322. Where no response is received to the corresponding request by the backend reader module 322 with the timer time period, the message request times-out. The backend reader module 322 then notifies the backend writer module 318 of the time-out event through the connector services 316. The backend writer module 318 then records the timed-out message request in a log. The log can be used during manual processing. A new message indicating that the request has timed out is generated in place of the response 402a, and the response 402a is then dispatched to the message source in the same way as is described above in connection with FIG. 12.

Figure 14:
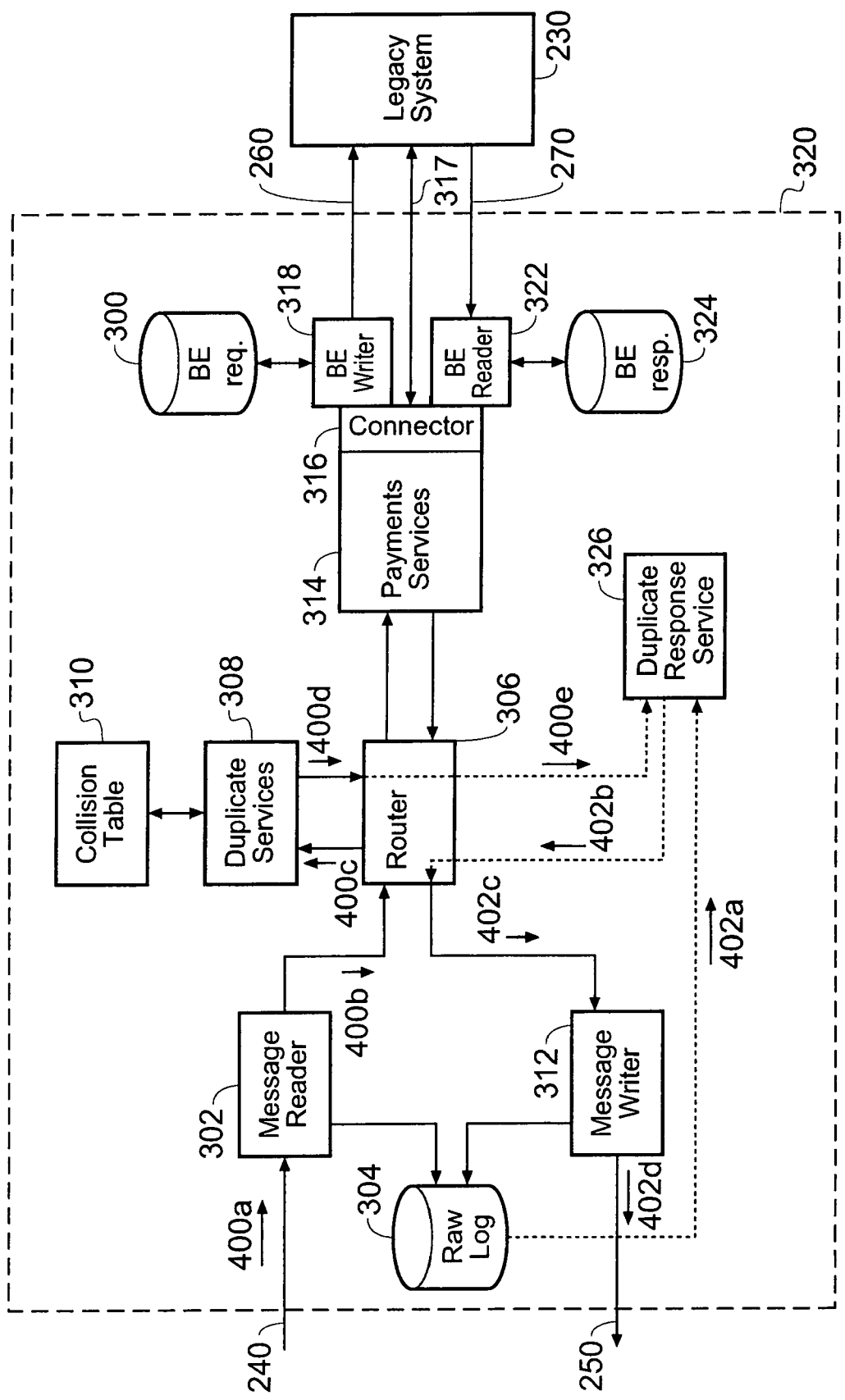
FIG. 14 shows the flow of a message request and response in a message brokering system according to the embodiment of FIG. 11.

FIG. 14 shows the flow of a message request 400 and response 402 in the message brokering system 320 of FIG. 11, when the request is screened by the first stage of the message brokering system 320. The message request position (400a-400e) is represented sequentially in the message brokering system 320 by the suffix letters a-e. The response position (402a-402d) is represented sequentially in the message brokering system 320 by the suffix letters a-d. The processes involved are the same as those discussed above in connection with FIG. 12 up until the point at which the message request 400c is received by a process providing checking for the duplicate services module 308.

On determining that there is a match between the message request 400c and a record in the collision table 310, the process implements the step of returning the message request 400c to the duplicate services module 308 with a duplicate attribute of the message request 400c set indicating that the message request is a duplicate. Duplicate services performs the step of dispatching the message request 400d to the router 306. The router 306 identifies that the duplicate attribute is set as part of its receiving process, and then performs the step of dispatching the message request 400e to the duplicate response service module 326.

The duplicate response service module 326 implements a process of checking the raw log database 304 for any existing response to the message request 400e. If the checking process determines that there is at least one existing response 402a, the duplicate response service module 326 performs the step of sending the most recent response 402b as if it were a new response to the router 306 for subsequently dispatching to the message writer service 312. If there is no existing response, the duplicate response service module 326 sends a new response 402b in place of any existing response 402a indicating that the message request is "in progress" to the router 306 for subsequently dispatching to the message writer service 312. The message writer service 312 performs the recording and forwarding steps as previously described, thereby dispatching the new response 402d along the message path 250.

Insofar as embodiments of the invention described above are implementable, at least in part, using a software-controlled programmable processing device such as a Digital Signal Processor, microprocessor, other processing devices, data processing apparatus or computer system, it will be appreciated that a computer program for configuring a programmable device, apparatus or system to implement the foregoing described methods is envisaged as an aspect of the present invention. The computer program may be embodied as source code and undergo compilation for implementation on a processing device, apparatus or system, or may be embodied as object code, for example. The skilled person would readily understand that the term computer in its most general sense encompasses programmable devices such as referred to above, and data processing apparatus and computer systems.

Suitably, the computer program is stored on a carrier medium in machine or device readable form, for example in solid-state memory, magnetic memory such as disc or tape, optically or magneto-optically readable memory, such as compact disk read-only or read-write memory (CD-ROM, CD-RW), digital versatile disk (DVD) etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

Although the invention has been described in relation to the preceding example embodiments, it will be understood by those skilled in the art that the invention is not limited thereto, and that many variations are possible falling within the scope of the invention. For example, methods for performing operations in accordance with any one or combination of the embodiments and aspects described herein are intended to fall within the scope of the invention. As another example, message request and response paths may be implemented using any available mechanisms, including mechanisms using one or more of: wired, WWW, LAN, Internet, WAN, wireless, optical, satellite, TV, cable, microwave, telephone, cellular etc. The message response and request paths may also be secure links. For example, the message response and request paths can be secure links created over the Internet using Public Key Encryption techniques or as an SSL link. It is also possible to use the message processing mechanism to formulate first and/or second stage responses to particular classes or types of message request. For example, message requests may be used to request information and/or invoke system administration functions.

It is to be understood that the first stage may be operable to check if message requests are new and dispatch any new message requests to the second stage, and check previously received message request messages to find any existing responses for dispatch to the message source. Moreover, the order of checking performed by the stages and whether or not checks are based upon negative or positive conditions are deemed to be only minor variations that are intended to fall within the scope of the invention.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during the prosecution of this application or of any such further application derived therefrom. In particular, with reference to the appended claims, features from dependent claims may be combined with those of the independent claims and features from respective independent claims may be combined in any appropriate manner and not merely in the specific combinations enumerated in the claims.

For the avoidance of doubt the term "comprising", as used herein throughout the description and claims is not to be construed solely as meaning "consisting only of".

The invention claimed is:

1. A message brokering mechanism, comprising first and second stages operable to exchange message requests and responses, wherein the first stage is operable to screen the message requests to be sent to the second stage, wherein to screen the message requests, the first stage is operable to determine if a message request of the message requests received from a message source corresponds to a message request previously sent to the second stage by the first stage, and, if the message request corresponds to the message request previously sent to the second stage, the first stage is operable to send a first stage response to the message source of the message request, wherein the first stage is operable to generate the first stage response independent of a message received from the second stage, and wherein the first stage is further operable to send the first stage response to the message source in response to subsequent message requests received from the message source that correspond to the message request previously sent to the second stage; and if the message request does not correspond to a message request previously sent to the second stage, the first stage is operable to send the message request to the second stage.

2. The message brokering mechanism of claim 1, wherein the second stage is operable to check whether there is an existing second stage response to the message request and, conditional on there being an existing second stage response, to dispatch the existing second stage response to the first stage.

3. The message brokering mechanism of claim 1, wherein the second stage comprises a message queue mechanism.

4. The message brokering mechanism of claim 1, wherein the second stage is operable to check whether the message request has been dispatched previously to a message processor and, where the message request has not been dispatched previously to the message processor, to dispatch the message request to the message processor.

5. The message brokering mechanism of claim 4, wherein the second stage is further operable to check that an actioned response has been dispatched from the message processor in response to the message request.

6. The message brokering mechanism of claim 5, wherein the second stage is operable to check that any said actioned response has been dispatched from the message processor in response to the message request after an elapse of a predetermined time period.

7. The message brokering mechanism of claim 4, wherein the message processor and the second stage are operable to communicate using query messages implemented according to a query protocol.

8. The message brokering mechanism of claim 7, wherein the query messages indicate one or more of the following: a) that the message processor has processed the message request; b) the result of processing the message request; c) that the message processor is currently processing the message request; d) that the second stage is to await the result of processing the message request; and e) that the second stage is to re-dispatch the message request to the message processor.

9. The message brokering mechanism of claim 4, wherein the second stage is further operable to dispatch a message indicating that a response to the request is not ready for transmission to the first stage, conditional on there being no existing second stage response and the message request having been dispatched previously to the message processor.

10. The message brokering mechanism of claim 1, wherein at least one of the first and second stages is operable to record identities of dispatched message requests.

11. The message brokering mechanism of claim 1, wherein at least one of the first and second stages is operable to record responses generated in response to message requests.

12. The message brokering mechanism of claim 1, wherein message requests and responses are dispatched between the first and second stages by a transaction control mechanism.

13. The message brokering mechanism of claim 12, wherein the transaction control mechanism comprises a transaction server operable to dispatch message requests and responses over a network.

14. A method of brokering messages, comprising:
receiving a message request, from a message source, at a first stage;
screening the message request to be sent to a second stage, wherein the first stage is operable to screen the message request and wherein said screening the message request comprises:
determining if the message request received from the message source corresponds to a message request previously sent to the second stage by the first stage, and,
if the message request corresponds to the message request previously sent to the second stage, sending a first stage response to the message source of the message request, wherein the first stage response indicates that the message request is being processed; and
if the message request does not correspond to a message request previously sent to the second stage, the first stage is operable to send the message request to the second stage;
wherein the first stage is operable to send the first stage response to the message source in response to subsequent message requests received from the message source that correspond to the message request previously sent to the second stage.

15. The method of claim 14, further comprising checking whether there is an existing second stage response to the message request at the second stage and, conditional on there being an existing second stage response, dispatching the existing second stage response to the first stage.

16. The method of claim 14, further comprising checking whether the message request has been dispatched previously from the second stage to a message processor and, where the message request has not been dispatched previously to the message processor, dispatching the message request to the message processor.

17. The method of claim 16, further comprising checking that an actioned response has been dispatched from the message processor in response to the message request.

18. The method of claim 17, further comprising checking that any said actioned response has been dispatched from the message processor in response to the message request after an elapse of a predetermined time period.

19. The method of claim 16, further comprising the message processor and the second stage communicating using query messages implemented according to a query protocol.

20. The method of claim 16, further comprising dispatching a message indicating that a response to the request is not ready for transmission from the second stage to the first stage, conditional on there being no existing second stage response and the message request having been dispatched previously to the message processor.

21. The method of claim 14, further comprising operating at least one of the first and second stages to record identities of dispatched message requests.

22. The method of claim 14, further comprising operating at least one of the first and second stages to record responses generated in response to message requests.

23. The message brokering mechanism of claim 1, wherein the first stage response indicates that the message request is still being processed.

24. The message brokering mechanism of claim 1, wherein the first stage is operable to store the first stage response and send the stored first stage response to the message source in response to the subsequent message requests received from the message source that correspond to the message request previously sent to the second stage.

25. The message brokering mechanism of claim 1, wherein said determining if a message request received from the message source corresponds to the message request previously sent to the second stage comprises determining if the first stage response already exists for the message request from the message source.

26. The method of claim 14, further comprising:
the first stage storing the first stage response; and
the first stage sending the stored first stage response to the message source in response to the subsequent message requests received from the message source that correspond to the message request previously sent to the second stage.

27. The method of claim 14, wherein said determining if a message request received from the message source corresponds to the message request previously sent to the second stage comprises determining if the first stage response already exists for the message request from the message source.

28. A method, comprising:
a first stage receiving a message request from a message source;
the first stage screening the received message request to be sent to a second stage,
wherein said screening the received message request comprises:
determining if a first stage response exists for the received message request, and
if a first stage response exists for the received message request, sending the first stage response to the message source of the message request; and
if a first stage response does not exist for the received message request, the first stage determining if a message request received from the message source corresponds to a message request previously sent to the second stage by the first stage;
if the message request corresponds to a message request previously sent to the second stage by the first stage, sending a first stage response to the message source, wherein the first stage response does not comprise a message previously received from the second stage; and
if the message request does not correspond to a message request previously sent to the second stage, the first stage sending the message request to the second stage.

29. The method of claim 28, wherein the first stage is further operable to send the first stage response to the message source in response to subsequent message requests received from the message source that correspond to the message request previously sent to the second.

30. The method of claim 28, wherein the first stage response indicates that the message request is still being processed.

31. The method of claim 28, further comprising:
the first stage storing the first stage response; and
the first stage sending the stored first stage response to the message source in response to subsequent message requests received from the message source that correspond to the message request previously sent to the second stage.

32. The method of claim 28, further comprising checking whether there is an existing second stage response to the message request at the second stage and, conditional on there being an existing second stage response, dispatching the existing second stage response to the first stage.

33. The method of claim 28, further comprising checking whether the message request has been dispatched previously from the second stage to a message processor and, where the message request has not been dispatched previously to the message processor, dispatching the message request to the message processor.

34. The method of claim 33, further comprising checking that an actioned response has been dispatched from the message processor in response to the message request.

35. The method of claim 34, further comprising checking that any said actioned response has been dispatched from the message processor in response to the message request after an elapse of a predetermined time period.

36. The method of claim 33, further comprising dispatching a message indicating that a response to the request is not ready for transmission from the second stage to the first stage, conditional on there being no existing second stage response and the message request having been dispatched previously to the message processor.

37. The method of claim 14, wherein if the message request received from the message source corresponds to a message request previously sent to the second stage by the first stage, and, if the message request corresponds to the message request previously sent to the second stage, sending a first stage response to the message source of the message request wherein the first stage is operable to generate the first stage response independent of a message received from the second stage.

* * * * *